US012731110B2

(12) United States Patent
Kohara et al.

(10) Patent No.: US 12,731,110 B2
(45) **Date of Patent: *Sep. 8, 2026**

(54) METHOD OF MANAGING WASTE PAPER RECYCLING INFORMATION AND WASTE PAPER RECYCLING SYSTEM

(71) Applicant: SEIKO EPSON CORPORATION, Tokyo (JP)

(72) Inventors: Suguru Kohara, Matsumoto (JP); Koichiro Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,556

(22) Filed: Nov. 27, 2024

(65) Prior Publication Data

US 2025/0182067 A1 Jun. 5, 2025

(30) Foreign Application Priority Data

Nov. 30, 2023 (JP) ................................ 2023-202530

(51) Int. Cl.
*G06Q 10/30* (2023.01)

(52) U.S. Cl.
CPC .................................. *G06Q 10/30* (2013.01)

(58) Field of Classification Search
CPC ..................................................... G06Q 10/30
See application file for complete search history.

(56) References Cited

FOREIGN PATENT DOCUMENTS

JP 2018168492 A * 11/2018 ............... B27N 3/04
JP 7029688 B2 3/2022

* cited by examiner

*Primary Examiner* — Fonya M Long
(74) *Attorney, Agent, or Firm* — Spencer Fane LLP

(57) ABSTRACT

Provided is a method of managing waste paper recycling information in a waste paper recycling system that includes a management server, a waste paper recycling apparatus, and a shredder. The shredder produces a plurality of paper fragments by shredding waste paper. The waste paper recycling apparatus recycles the paper fragments produced by the shredder into each sheet, measures a produced amount that is an amount of the sheets produced through the recycling, and transmits the produced amount to the management server. The management server calculates a cumulative value of the produced amount transmitted from the waste paper recycling apparatus within a predetermined period, compares the cumulative value with a production target value having been determined in advance, and, when the cumulative value reaches the production target value, performs notification, to the shredder and the waste paper recycling apparatus, of user notification information indicating the reaching to the production target value.

3 Claims, 11 Drawing Sheets

100
39
35
38
102
33
31
25
23
32
24
53
55
61a
61
59
65
66
50
51
W
103
M
62
70
71
72
42
70
41
40
P
68
81
P
67
91
82
21
101
P
S
95
15a
15
17
11
13
C
+Y1
+Z1
+X1

METHOD OF MANAGING WASTE PAPER RECYCLING INFORMATION AND WASTE PAPER RECYCLING SYSTEM

The present application is based on, and claims priority from JP Application Serial Number 2023-202530, filed Nov. 30, 2023, the disclosure of which is hereby incorporated by reference herein in its entirety.

BACKGROUND

1. Technical Field

The present disclosure relates to a method of managing waste paper recycling information and a waste paper recycling system.

2. Related Art

A sheet manufacturing system that recycles waste paper is known. A sheet manufacturing system disclosed in JP-A-2018-168492 includes a first apparatus, a second apparatus, and an analyzing server. The first apparatus is a coarse-crushing-and-defibrating apparatus that performs coarse crushing, etc. of waste paper. The second apparatus is a sheet manufacturing apparatus that manufactures sheets. The analyzing server gathers information about the operation history of the first apparatus and the second apparatus, and stores the gathered information. Based on the information gathered by the analyzing server, the administrator of the analyzing server judges whether the deployment of the first apparatus and the second apparatus is proper or not.

It is difficult for the user of the sheet manufacturing system to know that the result of sheet production through recycling contributes to an environmental improvement.

SUMMARY

A method of managing waste paper recycling information according to a certain aspect of the present disclosure is a method of managing waste paper recycling information in a waste paper recycling system that includes a management server, a waste paper recycling apparatus, and a shredder. The shredder produces a plurality of paper fragments by shredding waste paper. The waste paper recycling apparatus recycles the paper fragments produced by the shredder into each sheet, measures a produced amount that is an amount of the sheets produced through the recycling, and transmits the produced amount to the management server. The management server calculates a cumulative value of the produced amount transmitted from the waste paper recycling apparatus within a predetermined period, compares the cumulative value with a production target value having been determined in advance, and, when the cumulative value reaches the production target value, performs notification, to the shredder and the waste paper recycling apparatus, of user notification information indicating the reaching to the production target value.

A waste paper recycling system according to a certain aspect of the present disclosure is a waste paper recycling system that includes a management server, a waste paper recycling apparatus communicably connected to the management server via a network, and a shredder connected to the management server via the network. The shredder includes a shredding unit that produces a plurality of paper fragments by shredding waste paper, and a first communication unit for communicable connection to the management server via the network. The waste paper recycling apparatus includes a paper manufacturing unit that recycles the plurality of paper fragments produced by the shredder into each sheet, a counter that measures a produced amount of the sheets, and a second communication unit that transmits the produced amount to the management server via the network. The management server includes a third communication unit for communicable connection to the shredder and the waste paper recycling apparatus via the network, a storage unit that stores a production target value within a predetermined period of the sheets produced through the recycling by the waste paper recycling apparatus, and a control unit that calculates a cumulative value of the produced amount transmitted within the predetermined period from the waste paper recycling apparatus and compares the cumulative value with the production target value. When the cumulative value reaches the production target value, the control unit generates user notification information indicating the reaching to the production target value, and the third communication unit transmits the user notification information to the first communication unit of the shredder and the second communication unit of the waste paper recycling apparatus.

DESCRIPTION OF EMBODIMENTS

Figure 1:
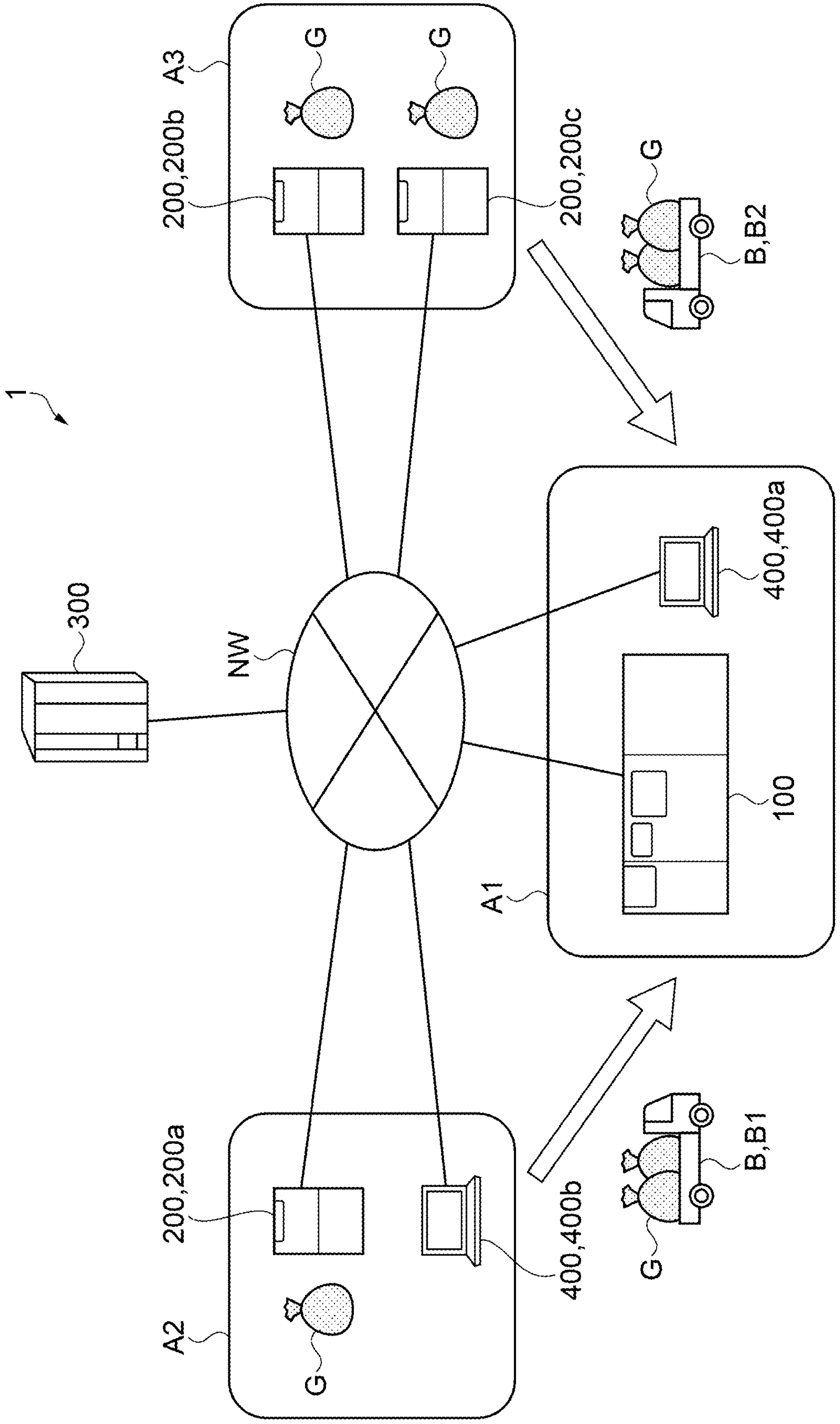
FIG. 1 is a diagram illustrating a schematic configuration of a waste paper recycling system.

FIG. 1 is a diagram illustrating a schematic configuration of a waste paper recycling system 1. The waste paper recycling system 1 includes a sheet manufacturing apparatus 100, a waste paper shredder 200, and a waste paper recycling management server 300. The waste paper recycling system 1 may include a terminal device 400. The waste paper recycling system 1 may include a plurality of sheet manufacturing apparatuses 100, a plurality of waste paper shredders 200, and a plurality of terminal devices 400. The sheet manufacturing apparatus 100, the waste paper shredder 200, the waste paper recycling management server 300, and the terminal device 400 are communicably connected to one another via a communication network NW. The communication network NW corresponds to an example of a network.

The sheet manufacturing apparatuses 100 and the waste paper shredders 200 that are included in the waste paper recycling system 1 are deployed in a distributed manner, for example, across a plurality of enterprises. The waste paper recycling management server 300 is managed by an administrator of the waste paper recycling system 1. The terminal devices 400 are deployed at enterprises where the sheet manufacturing apparatuses 100 and the waste paper shredders 200 are deployed.

The waste paper recycling system 1 illustrated in FIG. 1 is, for example, a system constructed across a plurality of enterprises. The plurality of enterprises includes a first enterprise A1, a second enterprise A2, and a third enterprise A3. The first enterprise A1 owns the sheet manufacturing apparatus 100 and a first terminal device 400*a*. The second enterprise A2 owns a first waste paper shredder 200*a* and a second terminal device 400*b*. The third enterprise A3 owns a second waste paper shredder 200*b* and a third waste paper shredder 200*c*. The first waste paper shredder 200*a*, the second waste paper shredder 200*b*, and the third waste paper shredder 200*c* are included in the plurality of waste paper shredders 200. The first terminal device 400*a* and the second terminal device 400*b* are included in the plurality of terminal devices 400.

The waste paper recycling system 1 illustrated in FIG. 1 functions by participation of the first enterprise A1, the second enterprise A2, the third enterprise A3, and the administrator in it. The first enterprise A1, the second enterprise A2, the third enterprise A3, and the administrator conduct environmental improvement activities using the waste paper recycling system 1.

The entity involved in the environmental improvement activities using the waste paper recycling system 1 is not limited to the three enterprises. The environmental improvement activities are conducted by one or more enterprises. The entity involved in the environmental improvement activities using the waste paper recycling system 1 is not limited to an enterprise(s). The entity involved in the environmental improvement activities may be a school(s), an administrative institution(s), or a combination of a school(s), an administrative institution(s), and an enterprise(s). The apparatuses/devices that are included in the waste paper recycling system 1 may be deployed in a distributed manner across a plurality of business facilities and/or offices that belong to a single enterprise. The entity involved in the environmental improvement activities using the waste paper recycling system 1 is set as appropriate.

The sheet manufacturing apparatus 100 reproduces a sheet P by using fragments of paper C as a raw material. Specifically, the sheet manufacturing apparatus 100 manufactures a sheet P by using fragments of paper C produced by the waste paper shredder 200 as a raw material, thereby recycling the fragments of paper C into the sheet P. The sheet manufacturing apparatus 100 is communicably connected to the waste paper recycling management server 300 via the communication network NW. The sheet manufacturing apparatus 100 corresponds to an example of a waste paper recycling apparatus.

The waste paper shredder 200 shreds waste paper. The waste paper shredder 200 produces a plurality of fragments of paper C by shredding waste paper. The produced fragments of paper C are collected into a collection bag G. The waste paper shredder 200 is communicably connected to the waste paper recycling management server 300 via the communication network NW. The waste paper shredder 200 corresponds to an example of a shredder.

The first waste paper shredder 200*a*, the second waste paper shredder 200*b*, and the third waste paper shredder 200*c* that are included in the plurality of waste paper shredders 200 each shred waste paper to produce a plurality of fragments of paper C. The first waste paper shredder 200*a*, the second waste paper shredder 200*b*, and the third waste paper shredder 200*c* may include the same shredding mechanism, or shredding mechanisms different from one another. The configuration of the first waste paper shredder 200*a*, the second waste paper shredder 200*b*, and the third waste paper shredder 200*c* is not specifically limited as long as they are configured to be able to transmit various kinds of information to the waste paper recycling management server 300 via the communication network NW. The various kinds of information include an amount of the plurality of fragments of paper C produced by the waste paper shredder 200.

The waste paper recycling management server 300 performs various kinds of data processing. The waste paper recycling management server 300 is communicably connected to the waste paper shredder 200 and the sheet manufacturing apparatus 100 via the communication network NW. The waste paper recycling management server 300 receives various kinds of information from the waste paper shredder 200 and the sheet manufacturing apparatus 100. The waste paper recycling management server 300 may be communicably connected to the terminal device 400 via the communication network NW. The waste paper recycling management server 300 conducts an analysis using various kinds of information. The waste paper recycling management server 300 generates environment-related information as the result of the analysis. The environment-related information will be described later. The waste paper recycling management server 300 transmits the result of the analysis to the waste paper shredder 200 and the sheet manufacturing apparatus 100. The waste paper recycling management server 300 may transmit the result of the analysis to the terminal device 400. The waste paper recycling management server 300 corresponds to an example of a management server.

The waste paper recycling management server 300 manages various kinds of information received from the waste paper shredder 200 and the sheet manufacturing apparatus 100. The waste paper recycling management server 300 manages the result of the analysis obtained by conducting the analysis using the various kinds of information. The waste paper recycling management server 300 manages the various kinds of information and the result of the analysis as system-related information. The system-related information includes the environment-related information. The waste paper recycling system 1 is administered on the basis of the system-related information. The waste paper recycling management server 300 performs storing, processing, distribution, deletion, etc. of various kinds of management data included in the system-related information. The system-related information corresponds to an example of waste paper recycling information.

The terminal device 400 displays various kinds of information. The terminal device 400 is a notebook personal computer, a desktop personal computer, a tablet terminal, a smartphone, or the like. The terminal device 400 displays various kinds of information by running an application. The application may be a web application that operates on a web browser, or a dedicated application. By displaying various kinds of information, the terminal device 400 notifies the user of the waste paper shredder 200, the user of the sheet manufacturing apparatus 100, or the like the various kinds of information. The terminal device 400 corresponds to an example of a communication terminal.

Each of the first terminal device 400*a* and the second terminal device 400*b* that are included in the plurality of terminal devices 400 displays various kinds of information.

On the first terminal device 400*a* and the second terminal device 400*b*, the various kinds of information are displayed by the running of the same application. The same information may be displayed on each of the first terminal device 400*a* and the second terminal device 400*b*, or different information may be displayed thereon.

The collection bag G stores the plurality of fragments of paper C produced by the waste paper shredder 200 in a transportable manner. The collection bag G stores the fragments of paper C the amount of which is measured by a mass sensor 229 provided in the waste paper shredder 200. The mass sensor 229 will be described later. The user of the waste paper shredder 200 may transfer the plurality of fragments of paper C produced by the waste paper shredder 200 from a container box 223 into the collection bag G. The user of the waste paper shredder 200 may attach the collection bag G to the container box 223 so as to cause the waste paper shredder 200 to put the plurality of fragments of paper C into the collection bag G directly. The collection bag G containing the plurality of fragments of paper C is transported by a transportation service provider B.

The transportation service provider B transports the collection bag G containing the plurality of fragments of paper C to the first enterprise A1. The first enterprise A1 owns the sheet manufacturing apparatus 100. In the waste paper recycling system 1 illustrated in FIG. 1, each of a first transportation service provider B1 and a second transportation service provider B2 transports the collection bags G to the first enterprise A1. The first transportation service provider B1 transports the collection bags G of the second enterprise A2 to the first enterprise A1. The second transportation service provider B2 transports the collection bags G of the third enterprise A3 to the first enterprise A1. Through the transportation by the first transportation service provider B1, the first enterprise A1 acquires the collection bags G of the second enterprise A2. Through the transportation by the second transportation service provider B2, the first enterprise A1 acquires the collection bags G of the third enterprise A3. The sheet manufacturing apparatus 100 of the first enterprise A1 reproduces the sheet P by using the plurality of fragments of paper C contained in the acquired collection bag G.

In the waste paper recycling system 1 illustrated in FIG. 1, the first transportation service provider B1 and the second transportation service provider B2 transport the collection bags G to the first enterprise A1. However, this does not imply any limitation. Either the first transportation service provider B1 or the second transportation service provider B2 may transport the collection bags G of the second enterprise A2 and the collection bags G of the third enterprise A3 to the first enterprise A1. The mode of transportation of the collection bags G is set as appropriate.

Figure 2:
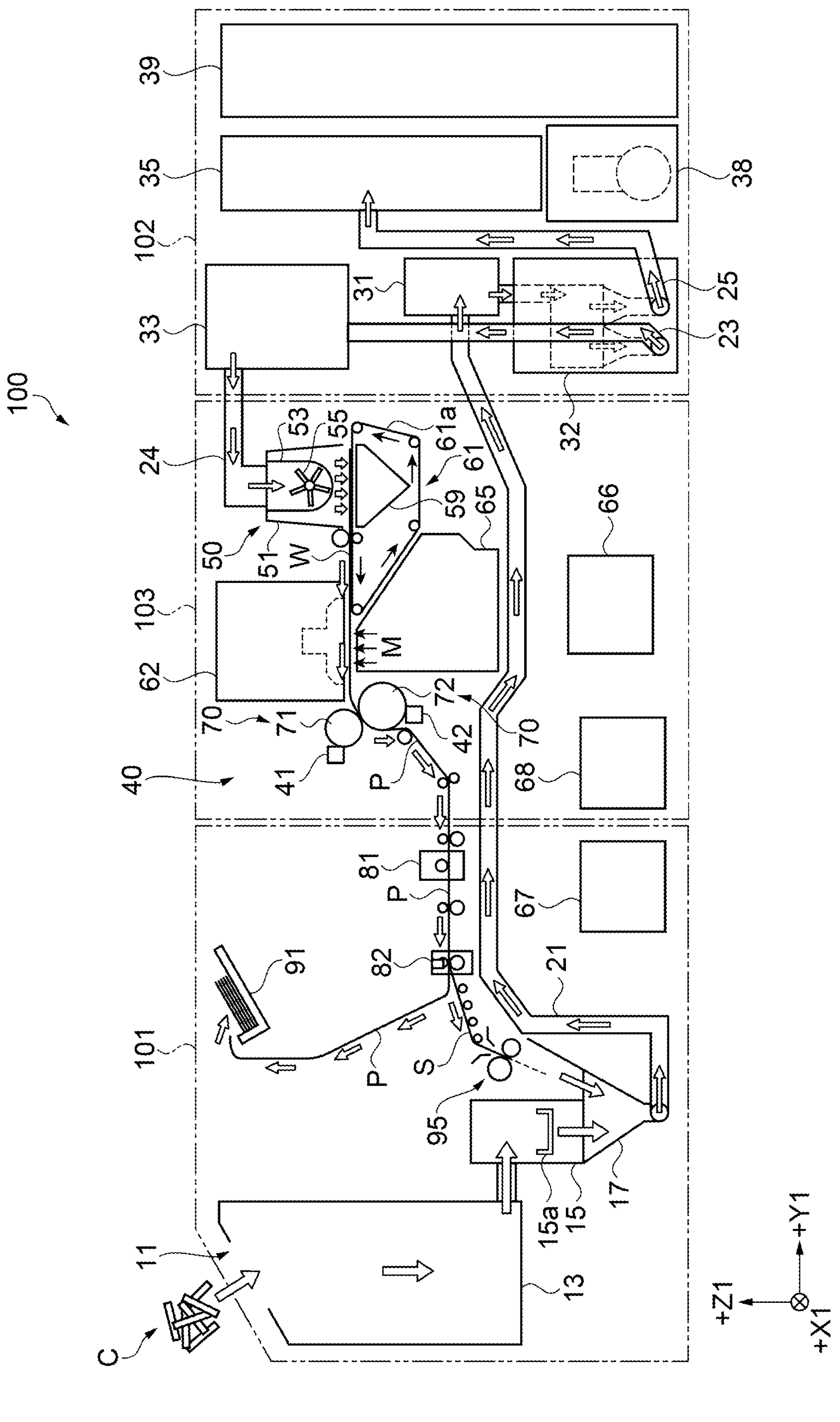
FIG. 2 is a diagram illustrating a schematic configuration of a sheet manufacturing apparatus.

FIG. 2 is a diagram illustrating a schematic configuration of the sheet manufacturing apparatus 100. The sheet manufacturing apparatus 100 recycles the fragments of paper C such as waste paper into a sheet by using a dry method. The method used by the sheet manufacturing apparatuses 100 is not limited to a dry method. A wet method may be used. The dry method mentioned here means a method of performing sheet reproduction under atmospheric conditions, for example, in air, instead of reproducing the sheet P in a liquid.

In FIG. 2, coordinate axes that are orthogonal to one another are denoted as an X1 axis, a Y1 axis, and a Z1 axis respectively. The direction pointed to by the corresponding arrow of each of these axes is defined as "+ direction", and the direction that is the opposite of the + direction is defined as "− direction". The Z1 axis is a virtual axis extending in a vertical direction, where the +Z1 direction means "vertically upward", and the −Z1 direction means "vertically downward". The −Z1 direction is a direction in which the gravity acts. The side toward which a raw material, a web W, the sheet P, and the like are transported inside the sheet manufacturing apparatus 100 will be sometimes hereafter referred to as "downstream", and the opposite side against this transportation direction will be sometimes hereafter referred to as "upstream". For convenience of illustration, each member is not drawn to scale.

The sheet manufacturing apparatus 100 includes a first unit group 101, a second unit group 102, and a third unit group 103. The first unit group 101, the second unit group 102, and the third unit group 103 are supported by frames that are not illustrated. In FIG. 2, the direction in which the fragments of paper C, the sheet P, slit strips S, unwanted remnants, and the like move is indicated by empty arrows.

The sheet manufacturing apparatus 100 reproduces the sheet P from the fragments of paper C. In the sheet manufacturing apparatuses 100, the first unit group 101, the third unit group 103, and the second unit group 102 are disposed in this order from the −Y1 directional side toward the +Y1 directional side in a side view taken from the −X1 directional side.

The fragments of paper C are sent from the first unit group 101 to the second unit group 102 through a first pipe 21 extending across the inside of the third unit group 103. The fragments of paper C turn into fibers by undergoing a defibration process and the like at the second unit group 102, and thereafter turn into a mixture containing a binder and the like. The mixture is sent to the third unit group 103 through a third pipe 24. The mixture is formed into the web W at the third unit group 103, and is thereafter formed into a band-shaped sheet P. The band-shaped sheet P is cut at the first unit group 101 and thus turns into the sheet P.

The first unit group 101 includes a buffer tank 13, a fixed amount supplying unit 15, a merging unit 17, and the first pipe 21. In the first unit group 101, the buffer tank 13, the fixed amount supplying unit 15, the merging unit 17, and the first pipe 21 are disposed in this order from the upstream side toward the downstream side. The first unit group 101 includes a first cutting unit 81, a second cutting unit 82, a tray 91, and a crushing unit 95. The first cutting unit 81 and the second cutting unit 82 cut the band-shaped sheet P into the sheet P having a predetermined shape. The first unit group 101 further includes a water supply unit 67. An example of the water supply unit 67 is a reservoir tank. The water supply unit 67 supplies humidifying water to each of a first humidifying unit 65 and a second humidifying unit 66, which will be described later, through non-illustrated water supply pipes.

The fragments of paper C are fed into the buffer tank 13 through a raw material feed port 11. The fragments of paper C contain fibers such as cellulose, and are, for example, shredded pieces of waste paper. Humidified air is supplied to the inside of the buffer tank 13 from the second humidifying unit 66 provided in the third unit group 103.

The fragments of paper C that are to be defibrated are temporarily stored in the buffer tank 13, and are thereafter sent to the fixed amount supplying unit 15 in accordance with the running of the sheet manufacturing apparatus 100. The sheet manufacturing apparatus 100 may include a shredding mechanism that shreds the fragments of paper C or the like upstream of the buffer tank 13.

The fixed amount supplying unit 15 includes a weighing device 15*a* and a non-illustrated supply mechanism. The weighing device 15*a* measures the mass of the fragments of paper C. The supply mechanism supplies the fragments of paper C having been weighed by the weighing device 15*a* to the merging unit 17 disposed downstream thereof. The fixed amount supplying unit 15 weighs the fragments of paper C into a predetermined mass by using the weighing device 15*a*, and supplies the predetermined mass of the fragments of paper C to the merging unit 17 disposed downstream thereof by using the supply mechanism.

A digital weighing mechanism and an analog weighing mechanism can be applied to the weighing device 15*a*. A physical sensor such as a load cell, and a device such as a spring balance, a pair of scales, and the like, can be used as the weighing device 15*a*. A load cell may be used as a preferred non-limiting example of the weighing device 15*a*. The predetermined mass into which the fragments of paper C are weighed by the weighing device 15*a* is, for example, several grams to several tens of grams or so.

Known technology such as a vibrating feeder can be applied to the supply mechanism. The supply mechanism may be included in the weighing device 15*a*.

The weighing and supplying of the fragments of paper C at the fixed amount supplying unit 15 is batch processing. The fragments of paper C are supplied from the fixed amount supplying unit 15 to the merging unit 17 intermittently. The fixed amount supplying unit 15 may include a plurality of weighing devices 15*a*. If the plurality of weighing devices 15*a* operates with predetermined time differences therebetween, weighing efficiency improves.

At the merging unit 17, fragments of the slit strips S supplied from the crushing unit 95 merge with, and are mixed with, the fragments of paper C supplied from the fixed amount supplying unit 15. The slit strips S and the crushing unit 95 will be described later. The fragments of paper C having been mixed with the slit fragments flow into the first pipe 21 from the merging unit 17.

The fragments of paper C are sent from the first unit group 101 to the second unit group 102 through the first pipe 21 by an airflow produced by a non-illustrated blower.

The second unit group 102 includes a defibrating unit 31 that is a dry defibrator, a separating unit 32, a second pipe 23, a mixing unit 33, and the third pipe 24. In the second unit group 102, the defibrating unit 31, the separating unit 32, the second pipe 23, the mixing unit 33, and the third pipe 24 are disposed in this order from the upstream side toward the downstream side. The second unit group 102 includes a fourth pipe 25 connected to the separating unit 32, a collecting unit 35, a compressor 38, and a power unit 39.

The fragments of paper C having been sent through the first pipe 21 flow into the defibrating unit 31. The defibrating unit 31 performs dry defibration to turn the fragments of paper C having been supplied from the fixed amount supplying unit 15 into fibers. A known defibrating mechanism can be applied to the defibrating unit 31.

The defibrating unit 31 includes, for example, a stator and a rotor. The stator has a substantially cylindrical inner surface. The rotor is disposed inside the stator, and rotates along the inner surface of the stator. The fragments of paper C are put between the inner surface of the stator and the rotor. The fragments of paper C are defibrated by a sheer force produced between the inner surface of the stator and the rotor. Entangled fibers included in the fragments of paper C become disentangled at the defibrating unit 31. The fibers included in the fragments of paper C are sent to the separating unit 32.

The separating unit 32 sorts the defibrated fibers. The separating unit 32 removes, from the fibers, ingredients that are not needed for manufacturing the sheet P. The separating unit 32 sorts the fibers into those that are relatively long and those that are relatively short. Fibers that are relatively short could sometimes cause a decrease in the strength of the sheet P. The separating unit 32 screens out fibers that are relatively short. The separating unit 32 screens out a colorant, an additive, and the like included in the fragments of paper C. Known technology such as a disc mesh scheme can be applied to the separating unit 32.

Humidified air is supplied to the inside of the separating unit 32 from the second humidifying unit 66 of the third unit group 103.

The fibers after the removal of those that are relatively short are sent to the mixing unit 33 through the second pipe 23. Unwanted ingredients such as the fibers that are relatively short, the colorant, and the like are discharged to the collecting unit 35 through the fourth pipe 25.

The mixing unit 33 produces a mixture by mixing a binder and the like into the fibers in air. The mixing unit 33 includes a flow passage through which the fibers are sent, a fan, a hopper, a supply duct, and a valve. The flow passage, the fan, the hopper, the supply duct, and the valve are not illustrated.

The hopper is in communication with the flow passage of the fibers through the supply duct. The valve is provided in the supply duct between the hopper and the flow passage. The hopper supplies the binder such as starch into the flow passage. The valve adjusts the mass of the binder supplied from the hopper into the flow passage. The mixing ratio of the fibers and the binder is adjusted using the valve.

The mixing unit 33 may have a configuration of supplying a material other than the binder. For example, the mixing unit 33 may have a configuration of supplying a colorant, an additive, or the like.

The fan of the mixing unit 33 produces an airflow. The mixing unit 33 produces a mixture by mixing the binder and the like into the fibers in air while sending the fibers downstream by using the airflow produced by the fan. The mixture flows into the third pipe 24 from the mixing unit 33.

The collecting unit 35 includes a non-illustrated filter. The filter traps the unwanted ingredients such as the relatively short fibers coming in by being transported by the air flowing in the fourth pipe 25.

The compressor 38 produces compressed air. It could happen that the filter of the collecting unit 35 becomes clogged by fine particles or the like included in the unwanted ingredients. In such a case, it is possible to clean the filter by blowing the particles away by applying the compressed air produced by the compressor 38 to the filter.

The power unit 39 includes a power supply device that supplies power to each component of the sheet manufacturing apparatus 100. The power supply device is not illustrated. The power unit 39 distributes, to each component of the sheet manufacturing apparatus 100, power supplied from the outside.

The third unit group 103 causes the mixture containing the fibers having been produced from the fragments of paper C to pile up, thereby producing an accumulation of the mixture, and presses the accumulation of the mixture, thereby reproducing the band-shaped sheet P that is recycled paper. The third unit group 103 includes an accumulating unit 50, a first transporting unit 61, a second transporting unit 62, the first humidifying unit 65, the second humidifying unit 66, a drainage unit 68, a molding unit 70, and a cleaning device 40. The third unit group 103 corresponds to an example of a paper manufacturing unit.

In the third unit group 103, the accumulating unit 50, the first transporting unit 61, the second transporting unit 62, the first humidifying unit 65, the molding unit 70, and the cleaning device 40 are disposed in this order from the upstream side toward the downstream side. The second humidifying unit 66 is disposed under the first humidifying unit 65.

The accumulating unit 50 forms the web W by letting the mixture containing the sorted fibers fall in air to pile up. The accumulating unit 50 includes a drum member 53, a blade member 55 provided inside the drum member 53, a housing 51 in which the drum member 53 is housed, and a suction unit 59. The mixture is taken into the drum member 53 from the third pipe 24.

The first transporting unit 61 is disposed under the accumulating unit 50. The first transporting unit 61 includes a mesh belt 61*a*, and five tensioning rollers on and around which the mesh belt 61*a* is tensioned. The suction unit 59 faces the drum member 53, with the mesh belt 61*a* interposed therebetween, along the Z1 axis.

The blade member 55 is disposed inside the drum member 53. The blade member 55 is driven to rotate by a non-illustrated motor. The drum member 53 is a semi-cylindrical sieve. A net that has a sieve function is provided at the lower surface of the drum member 53. The drum member 53 allows fibers, mixture particles, etc. that are each smaller than the mesh of the net of the sieve to pass from the inside to the outside of the drum member 53.

The mixture is agitated by the blade member 55 rotating inside the drum member 53, and is discharged to the outside of the drum member 53. Humidified air is supplied to the inside of the drum member 53 from the second humidifying unit 66.

The suction unit 59 is disposed under the drum member 53. The suction unit 59 sucks air that is present inside the housing 51 through a plurality of holes that the mesh belt 61*a* has. The plurality of holes of the mesh belt 61*a* allows air to pass, but does not allow the fibers, the binder, etc. contained in the mixture to pass easily. The mixture having been discharged to the outside of the drum member 53 is sucked downward together with the air. The suction unit 59 is a known suction device such as a blower.

The mixture is dispersed in the air that is present inside the housing 51, and falls due to the gravity and due to the suction by the suction unit 59 to pile up on the upper surface of the mesh belt 61*a*. The web W is formed as a result of the mixture piling up on the upper surface of the mesh belt 61*a*.

The mesh belt 61*a* is an endless belt. The mesh belt 61*a* is tensioned by the five tensioning rollers. Due to the rotation of the tensioning rollers, the mesh belt 61*a* turns counter-clockwise in a view taken from the −X1 directional side. The mixture piles up on the mesh belt 61*a* successively, thereby forming the web W. The web W contains a relatively large amount of air and is thus soft and bulky. By using the turning of the mesh belt 61*a*, the first transporting unit 61 transports the web W having been formed thereon toward the downstream side.

Downstream of the first transporting unit 61, the second transporting unit 62 takes over the transportation of the web W from the first transporting unit 61. The second transporting unit 62 causes the web W to come off from the upper surface of the mesh belt 61*a*. The second transporting unit 62 transports the web W having come off toward the molding unit 70. The second transporting unit 62 is disposed over the transportation path of the web W upstream of the −Y1 directional end of the mesh belt 61*a*. The second transporting unit 62 and the mesh belt 61*a* are disposed in such a way as to partially overlap with each other along the Z1 axis.

The second transporting unit 62 includes a transportation belt, a plurality of rollers, and a suction mechanism that are not illustrated. A plurality of holes that allows air to pass is provided in the transportation belt. The transportation belt is tensioned by the plurality of rollers, and turns due to the rotation of these rollers.

The second transporting unit 62 causes the upper surface of the web W to be sucked onto the lower surface of the transportation belt by means of negative pressure generated by the suction mechanism. The transportation belt turns with the web W sucked, thereby transporting the web W downstream.

The first humidifying unit 65 humidifies the web W that includes the fibers having been accumulated by the accumulating unit 50 of the third unit group 103. The first humidifying unit 65 is, for example, a mist-type humidifier. The first humidifying unit 65 supplies a mist M for humidification from below to the web W that is transported by the second transporting unit 62. The first humidifying unit 65 is disposed under the second transporting unit 62. The first humidifying unit 65 faces the web W that is transported by the second transporting unit 62. A known humidifying device, for example, an ultrasonic humidifying device or the like, can be applied to the first humidifying unit 65.

Humidifying the web W with the mist M facilitates the function of the starch as the binder. This enhances the strength of the sheet P. Since the first humidifying unit 65 supplies the mist M to the web W from below, it is possible to prevent the dropping of a droplet originating from the mist M onto the web W. Since the first humidifying unit 65 humidifies the web W from the side that is the opposite of the contact surface of the transportation belt and the web W, it is possible to suppress the clinging of the web W to the transportation belt. The second transporting unit 62 transports the web W to the molding unit 70.

The molding unit 70 molds the web W containing the fibers into a shape of the band-like sheet P by applying heat and pressure thereto. The molding unit 70 includes a first molding roller 71 and a second molding roller 72. An electric heater is built in each of the first molding roller 71 and the second molding roller 72. Each of the first molding roller 71 and the second molding roller 72 is capable of increasing the temperature of a roller surface.

The first molding roller 71 and the second molding roller 72 are substantially columnar members. The rotating shaft of the first molding roller 71 and the rotating shaft of the second molding roller 72 are disposed along the X1 axis. The first molding roller 71 is disposed over the transportation path of the web W. The second molding roller 72 is disposed under the transportation path of the web W. Between the first molding roller 71 and the second molding roller 72, there is a clearance corresponding to the thickness of the sheet P that is to be manufactured.

The first molding roller 71 and the second molding roller 72 are driven to rotate by a non-illustrated molding roller driving motor. The web W is sent downstream while being nipped between the first molding roller 71 and the second molding roller 72 and receiving heat and pressure thereat. The web W passes through the molding unit 70 continuously and is press-molded while receiving heat. Using the first molding roller 71 and the second molding roller 72 makes it possible to apply heat and pressure to the web W efficiently.

By passing through the molding unit 70, the web W, which is in a state of containing a relatively large amount of air and being thus soft and bulky, is molded into the band-shaped sheet P, which is in a state of containing less air. The fibers contained in the band-shaped sheet P become bound to one another by the binder. The band-shaped sheet P is transported to the first unit group 101 by non-illustrated transporting rollers.

The cleaning device 40 includes a first cleaning device 41 corresponding to the first molding roller 71 and a second cleaning device 42 corresponding to the second molding roller 72. The cleaning device 40 includes non-illustrated cleaning rollers.

The second humidifying unit 66 is disposed under the first humidifying unit 65. A known vaporization-type humidifying device can be applied to the second humidifying unit 66. For example, a vaporization-type humidifying device blows air to a wet nonwoven fabric or the like to vaporize moisture, thereby producing humidified air.

The second humidifying unit 66 humidifies a predetermined area in the sheet manufacturing apparatus 100. The predetermined area is an area that includes one or more of the buffer tank 13, the separating unit 32, and the drum member 53 of the accumulating unit 50. Humidified air is supplied to the predetermined area from the second humidifying unit 66 through a plurality of non-illustrated ducts. The humidified air suppresses electrification of the fragments of paper C, the fibers, and the like, thereby suppressing the static cling of the fragments of paper C, the fibers, and the like to the members.

The drainage unit 68 is a drain tank. The drainage unit 68 collects and stores moisture having been used by the first humidifying unit 65, the second humidifying unit 66, and the like. The drainage unit 68 is detached from the sheet manufacturing apparatus 100 when necessary. The drainage unit 68 is configured such that a pool of water stored in it can be discarded.

The band-shaped sheet P transported to the first unit group 101 arrives at the first cutting unit 81. The first cutting unit 81 cuts the band-shaped sheet P in a direction intersecting with the transportation direction thereof. An example of the direction intersecting with the transportation direction of the band-shaped sheet P is a direction that is along the X1 axis. The band-shaped sheet P is cut into each sheet P having a single-cut size at the first cutting unit 81. The single-size-cut sheet P is sent from the first cutting unit 81 to the second cutting unit 82.

The second cutting unit 82 cuts the single-size-cut sheet P in the transportation direction. An example of the transportation direction of the single-size-cut sheet P is a direction along the Y1 axis. The second cutting unit 82 trims the region near the +X1-directional-side edge and the region near the −X1-directional-side edge of the single-size-cut sheet P. The second cutting unit 82 shapes the single-size-cut sheet P into the sheet P having a predetermined shape, for example, an A4-sized shape, an A3-sized shape, or the like.

When the second cutting unit 82 cuts the single-size-cut sheet P, the slit strips S, which are remnants, are produced. The slit strips S are sent in substantially the −Y1 direction, and arrive at the crushing unit 95. The crushing unit 95 crushes the slit strips S into pieces, and supplies the crushed pieces to the merging unit 17. A mechanism that weighs the crushed pieces of the slit strips S and supplies a weighed amount of the crushed pieces to the merging unit 17 may be provided between the crushing unit 95 and the merging unit 17.

The sheets P are transported upward, and are then stacked on the tray 91. The sheets P are manufactured by the sheet manufacturing apparatus 100 as recycled paper. The sheet P can be used as, for example, a substitute for copier paper or the like.

Figure 3:
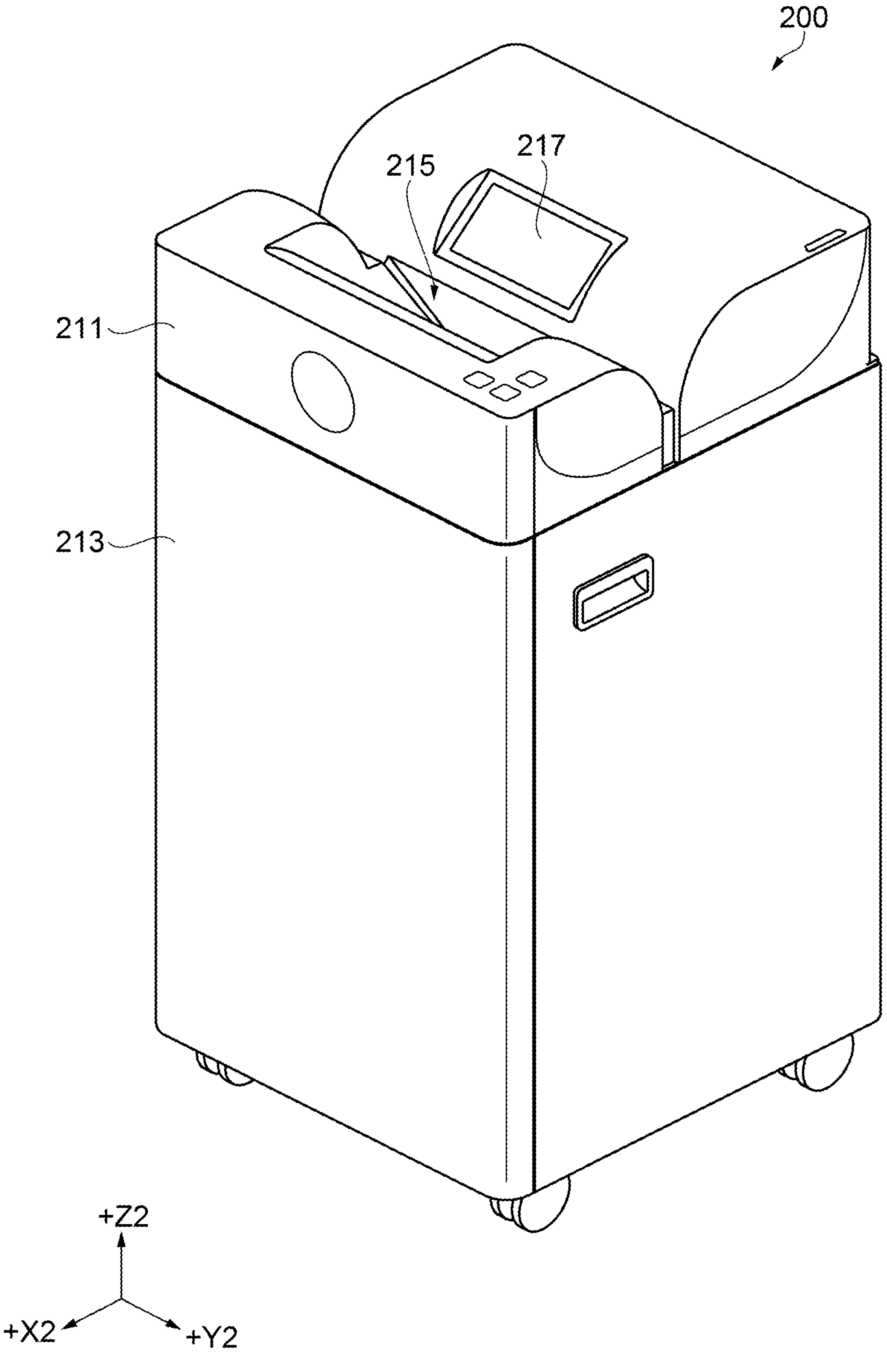
FIG. 3 is a diagram illustrating an external appearance of a waste paper shredder.

FIG. 3 is a diagram illustrating an external appearance of the waste paper shredder 200. In FIG. 3, the external appearance of the waste paper shredder 200 is illustrated in a perspective view. The waste paper shredder 200 produces the fragments of paper C by shredding waste paper. The fragments of paper C are used as a raw material by the sheet manufacturing apparatus 100. The waste paper shredder 200 includes an armoring cabinet 211, an open-and-close door 213, a paper feed port 215, and a shredder display panel 217.

A coordinate system is illustrated in FIG. 3, and in FIG. 4, which will be described later. The Z2 axis is an axis that is perpendicular to a plane on which the waste paper shredder 200 is installed. The +Z2 direction is a direction going up from the installation plane. The −Z2 direction is a direction going down toward the installation plane. The X2 axis is an axis that is parallel to the installation plane. The X2 axis is an axis that connects the front face to the rear face of the waste paper shredder 200. The front face of the waste paper shredder 200 is a surface that faces the user of the waste paper shredder 200 when the user stands in front of the shredder display panel 217. The rear face is a face that is the opposite of the front face. The +X2 direction is a direction going from the rear face toward the front face of the waste paper shredder 200. The −X2 direction is a direction going from the front face toward the rear face thereof. The Y2 axis is an axis that is parallel to the installation plane. The Y2 axis is an axis that is orthogonal to the X2 axis. The +Y2 direction is a direction going from the left toward the right in a plan view taken from the front face of the waste paper shredder 200. The −Y2 direction is a direction going from the right toward the left in a plan view taken from the front face of the waste paper shredder 200.

The armoring cabinet 211 is an external enclosure that covers each unit of the waste paper shredder 200. The armoring cabinet 211 has the open-and-close door 213, the paper feed port 215, and the shredder display panel 217. The armoring cabinet 211 illustrated in FIG. 3 has a shape like a rectangular parallelepiped; however, this does not imply any limitation. The shape of the armoring cabinet 211 is set as appropriate.

The open-and-close door 213 is provided as a part of the armoring cabinet 211. The open-and-close door 213 is configured to be openable and closable. The open-and-close door 213 turns around a pivot extending along the Z2 axis. The open-and-close door 213 is opened and closed by a user. When the user opens the open-and-close door 213, each unit disposed inside the armoring cabinet 211 becomes able to be accessed by the user.

The paper feed port 215 is an opening through which waste paper is fed in. The paper feed port 215 is provided in the +Z2-directional-side surface of the armoring cabinet 211. Waste paper is supplied through the paper feed port 215 to a shredding unit 221, which will be described later. The paper feed port 215 is configured such that a plurality of sheets of paper can be fed through it together in a batch.

The shredder display panel 217 displays various kinds of information. The shredder display panel 217 displays error information such as, for example, “full”, “over-temperature”, and the like. The shredder display panel 217 displays an amount of paper processed by the waste paper shredder 200, and the like. The shredder display panel 217 is a liquid crystal panel, an organic electro-luminescence (EL) panel, or the like. The shredder display panel 217 corresponds to an example of a display panel.

Figure 4:
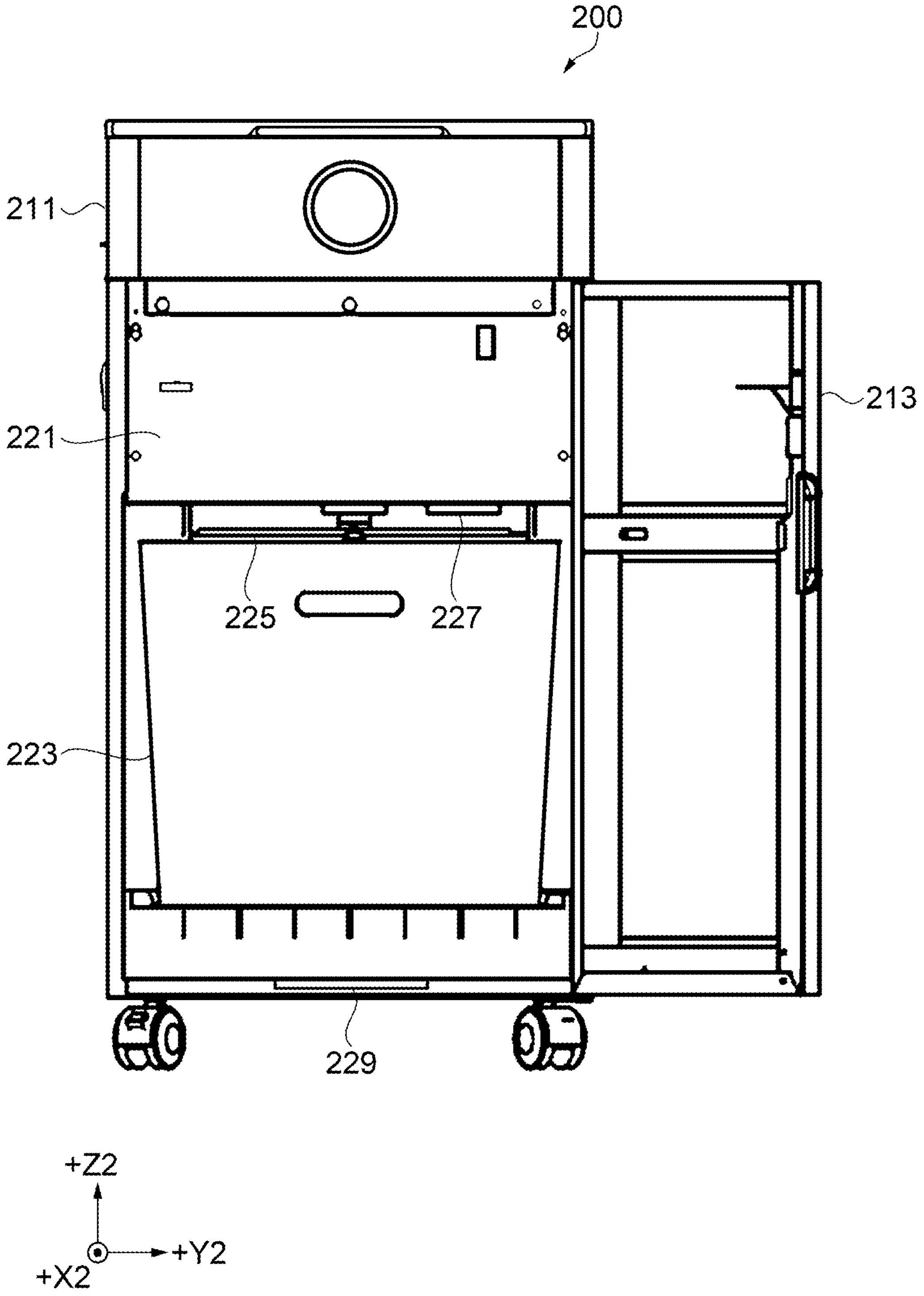
FIG. 4 is a diagram illustrating a schematic configuration of the waste paper shredder.

FIG. 4 is a diagram illustrating a schematic configuration of the waste paper shredder 200. In FIG. 4, the waste paper shredder 200 viewed from the +X2 directional side is illustrated in a plan view. In FIG. 4, the waste paper shredder 200 with the open-and-close door 213 opened is illustrated. In FIG. 4, each unit housed inside the armoring cabinet 211 is illustrated. The armoring cabinet 211 houses a shredding unit 221, the container box 223, a leveling member 225, an optical sensor 227, and the mass sensor 229 inside.

The shredding unit 221 produces a plurality of fragments of paper C by shredding waste paper. The shredding unit 221 includes a plurality of cutters and a shredding unit driving mechanism. The plurality of cutters and the shredding unit driving mechanism are not illustrated. For example, the shredding unit 221 includes a pair of cylindrical cutters. Each of the pair of cylindrical cutters has blades at its peripheral surface. The blades formed at the peripheral surface of each of the pair of cylindrical cutters rotate in a state of being laced in those of the counterpart. The pair of cylindrical cutters are driven to rotate by the shredding unit driving mechanism. Paper fed in through the paper feed port 215 is shredded by the pair of cylindrical cutters. The shredding unit 221 may include a cross cutter that performs cutting in a direction intersecting with the rotating shaft of the cylindrical cutter. The configuration of the shredding unit 221 is not specifically limited as long as it shreds waste paper. The configuration of the shredding unit 221 can be set as appropriate. The shredding unit 221 corresponds to an example of a shredding unit.

The shredding unit 221 has a non-illustrated shredding unit opening. The shredding unit opening is provided in the −Z2-directional-side face of the shredding unit 221. The shredding unit 221 discharges the fragments of paper C through the shredding unit opening. The fragments of paper C fall from the shredding unit opening in the −Z2 direction.

The container box 223 contains the plurality of fragments of paper C produced by shredding waste paper by the shredding unit 221. The container box 223 is a hollow container. The container box 223 is disposed inside the armoring cabinet 211 at a −Z2-directional-side position with respect to the shredding unit 221. When the user opens the open-and-close door 213, the container box 223 becomes able to be accessed by the user. The container box 223 can be taken out of the armoring cabinet 211 by the user. The fragments of paper C contained in the container box 223 are enveloped in the collection bag G. The collection bag G may have been attached to the container box 223 in advance.

The leveling member 225 makes the top of the plurality of fragments of paper C contained in the container box 223 flat. The leveling member 225 is disposed at a −Z2-directional-side position with respect to the shredding unit 221. The leveling member 225 is driven by a non-illustrated leveling member driving mechanism. Though the waste paper shredder 200 illustrated in FIG. 4 is equipped with the leveling member 225, this does not imply any limitation. The waste paper shredder 200 may be equipped with the leveling member 225, or not equipped with it. The waste paper shredder 200 may preferably be equipped with the leveling member 225. With the leveling member 225, it is possible to efficiently use the capacity of the container box 223.

The optical sensor 227 detects the bulk height of the plurality of fragments of paper C contained in the container box 223. The optical sensor 227 illustrated in FIG. 4 is disposed at a +Z2-directional-side position with respect to the container box 223. The optical sensor 227 is, for example, a reflection-type sensor. The reflection-type sensor detects reflected light of emitted light. The reflection-type sensor detects the bulk height of the plurality of fragments of paper C by detecting the position along the Z2 axis of the plurality of fragments of paper C contained in the container box 223. As a result of the optical sensor 227 detecting the bulk height of the plurality of fragments of paper C, the waste paper shredder 200 is capable of detecting whether the container box 223 is full or not. The optical sensor 227 is not limited to a reflection-type sensor. The optical sensor 227 may be a transmission-type sensor. The position of the optical sensor 227 is not limited to a +Z2-directional-side position with respect to the container box 223. The optical sensor 227 may be disposed at any position as long as it is capable of detecting the bulk height of the plurality of fragments of paper C contained in the container box 223.

The mass sensor 229 measures the mass of the plurality of fragments of paper C contained in the container box 223. The mass sensor 229 is, for example, a load cell. The mass sensor 229 measures the amount of the plurality of fragments of paper C contained in the container box 223 by measuring the mass of the container box 223. As a result of the mass sensor 229 measuring the amount of the plurality of fragments of paper C, the waste paper shredder 200 is capable of detecting whether the container box 223 is full or not. The mass sensor 229 is disposed at a −Z2-directional-side position with respect to the container box 223. The mass sensor 229 outputs the measured amount of the paper fragments.

Figure 5:
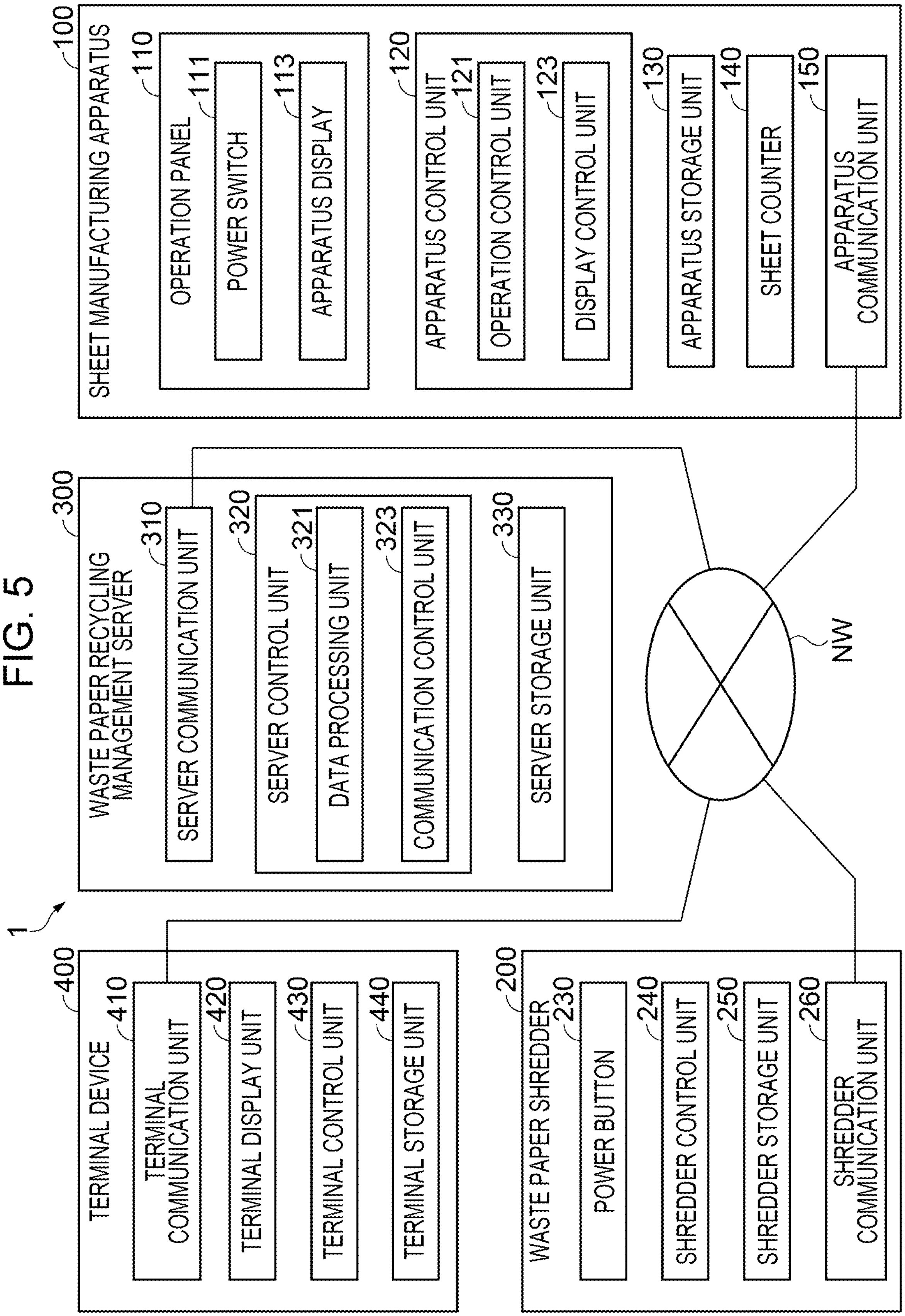
FIG. 5 is a diagram illustrating a block configuration of the waste paper recycling system.

FIG. 5 is a diagram illustrating a block configuration of the waste paper recycling system 1. In FIG. 5, the waste paper recycling system 1 that includes a single sheet manufacturing apparatus 100, a single waste paper shredder 200, the waste paper recycling management server 300, and a single terminal device 400 is illustrated. The sheet manufacturing apparatus 100, the waste paper shredder 200, the waste paper recycling management server 300, and the terminal device 400 are communicably connected to one another via the communication network NW.

The sheet manufacturing apparatus 100 includes an operation panel 110, an apparatus control unit 120, an apparatus storage unit 130, a sheet counter 140, and an apparatus communication unit 150. The operation panel 110, the apparatus control unit 120, the apparatus storage unit 130, the sheet counter 140, and the apparatus communication unit 150 are disposed as appropriate inside the sheet manufacturing apparatus 100, etc.

The operation panel 110 is operated by the user of the sheet manufacturing apparatus 100. The operation panel 110 receives various kinds of input based on operations performed by the user of the sheet manufacturing apparatus 100. The operation panel 110 includes a power switch 111 and an apparatus display 113. The operation panel 110 may include input switches other than the power switch 111. The user of the sheet manufacturing apparatus 100 performs various kinds of setting operation by operating the input switches.

The power switch 111 receives a power input operation and a power input stop operation performed by the user of the sheet manufacturing apparatus 100. When the user of the sheet manufacturing apparatus 100 operates the power switch 111, the sheet manufacturing apparatus 100 is powered on or powered off.

The apparatus display 113 displays various kinds of information. Based on data, etc. transmitted from the waste paper recycling management server 300, the apparatus display 113 displays various kinds of information such as environment-related information. The apparatus display 113 is a liquid crystal panel, an organic EL panel, or the like. The apparatus display 113 corresponds to an example of a display.

The apparatus display 113 may be a touch panel having a touch input function. The user of the sheet manufacturing apparatus 100 performs various kinds of setting operation by performing an operation input on the apparatus display 113. The user of the sheet manufacturing apparatus 100 performs a target setting operation as an example of the setting operation. The target setting operation is a setting operation of an environmental target value such as an amount of the sheets P to be manufactured within a predetermined period. The user of the sheet manufacturing apparatus 100 sets the environmental target value by performing the target setting operation on the apparatus display 113. The environmental target value is transmitted to the waste paper recycling management server 300 by means of the apparatus communication unit 150. The input switches may be used for performing the target setting operation. The environmental target value corresponds to an example of a production target value.

The apparatus control unit 120 is an apparatus controller that controls each unit of the sheet manufacturing apparatus 100. The apparatus control unit 120 is, for example, a processor(s) that includes a central processing unit (CPU). The apparatus control unit 120 is configured as a single processor or is made up of a plurality of processors. The apparatus control unit 120 operates as various function units by executing an apparatus control program. The apparatus control unit 120 functions as an operation control unit 121 and a display control unit 123 by executing the apparatus control program. The apparatus control unit 120 may function as a function unit other than the operation control unit 121 and the display control unit 123 by executing the apparatus control program. The operation control unit 121 controls the operation of the defibrating unit 31, the separating unit 32, the mixing unit 33, and the like. By controlling the operation of each unit, the operation control unit 121 causes the sheet manufacturing apparatus 100 to manufacture the sheet P.

The operation control unit 121 causes the sheet counter 140 to count the number of the sheets P manufactured by the sheet manufacturing apparatus 100, which is hereinafter referred to as "the produced number of the sheets P". Based on the produced number of the sheets P counted by the sheet counter 140, the operation control unit 121 may measure the mass of the sheets P manufactured by the sheet manufacturing apparatus 100, which is hereinafter referred to as "the produced mass of the sheets P". The produced mass of the sheets P is calculated by multiplying the produced number of the sheets P by a mass per sheet P. The operation control unit 121 measures either the produced number of the sheets P or the produced mass of the sheets P as the produced amount of the sheets P. The operation control unit 121 may measure both the produced number of the sheets P and the produced mass of the sheets P as the produced amount of the sheets P.

The operation control unit 121 controls communication performed by the apparatus communication unit 150. The operation control unit 121 controls the apparatus communication unit 150 and causes it to transmit the produced amount of the sheets P to the waste paper recycling management server 300. The operation control unit 121 causes the apparatus communication unit 150 to transmit the produced amount of the sheets P to the waste paper recycling management server 300 at a predetermined timing. The predetermined timing is, for example, at time intervals having been determined in advance. The predetermined timing may be at the time of activation of the sheet manufacturing apparatus 100 or at the time of stopping thereof. When the user of the sheet manufacturing apparatus 100 performs a power input operation on the power switch 111, the operation control unit 121 commands that the produced amount of the sheets P be transmitted to the waste paper recycling management server 300. When the sheet manufacturing apparatus 100 finishes the manufacturing of the sheets P, the operation control unit 121 commands that the produced amount of the sheets P be transmitted to the waste paper recycling management server 300. The operation control unit 121 causes the apparatus communication unit 150 to receive, from the waste paper recycling management server 300, notification data, etc. that is based on the produced amount of the sheets P having been transmitted thereto. The notification data will be described later.

The display control unit 123 controls display information displayed on the apparatus display 113. The display control unit 123 causes the apparatus display 113 to display the environment-related information on the basis of the notification data having been received from the waste paper recycling management server 300. The display control unit 123 may cause the apparatus display 113 to display any information other than the environment-related information. For example, the display control unit 123 may cause the apparatus display 113 to display the produced amount of the sheets P.

The apparatus storage unit 130 stores various programs and various kinds of data. The apparatus storage unit 130 stores the apparatus control program. The apparatus storage unit 130 stores the produced amount of the sheets P, the environment-related information, and the like. The apparatus storage unit 130 is a volatile semiconductor memory such as a random access memory (RAM), a read only memory (ROM), a non-volatile memory such as a flash memory, etc.

The sheet counter 140 measures the produced amount of the sheets P manufactured by the sheet manufacturing apparatus 100. The sheet counter 140 measures, as the produced amount, the produced number of the sheets P manufactured by the sheet manufacturing apparatus 100. The sheet counter 140 may measure, as the produced amount, the produced mass of the sheets P manufactured by the sheet manufacturing apparatus 100. The sheet counter 140 measures the produced number, etc. of the sheets P that are stacked on the tray 91. The sheet counter 140 is disposed at the tray 91 or on the transportation path along which the sheets P are transported to the tray 91. The sheet counter 140 is an optical sensor or the like. The sheet counter 140 corresponds to an example of a counter.

The apparatus communication unit 150 is an interface circuit for communicable connection to the waste paper recycling management server 300 and the like. The apparatus communication unit 150 gets connected to the waste paper recycling management server 300 and the like by wire or wirelessly in accordance with a predetermined communication protocol. The apparatus communication unit 150 includes a wired connector, a wireless communication port, or the like. The wired connector is a universal serial bus (USB) connector, a local area network (LAN) connector, or the like. The wireless communication port is a Wi-Fi communication port, a Bluetooth communication port, or the like. "Wi-Fi" and "Bluetooth" are registered trademarks. The apparatus communication unit 150 receives various kinds of information from the waste paper recycling management server 300 and the like via the communication network NW. The apparatus communication unit 150 transmits the produced amount of the sheets P and the like to the waste paper recycling management server 300 and the like via the communication network NW. The apparatus communication unit 150 corresponds to an example of a second communication unit.

The waste paper shredder 200 includes a power button 230, a shredder control unit 240, a shredder storage unit 250, and a shredder communication unit 260.

The power button 230 receives a power input operation and a power input stop operation performed by the user of the waste paper shredder 200. When the user of the waste paper shredder 200 operates the power button 230, the waste paper shredder 200 is powered on or powered off. When the waste paper shredder 200 is powered on, the waste paper shredder 200 becomes able to shred waste paper.

The shredder control unit 240 is a shredder controller that controls each unit of the waste paper shredder 200. The shredder control unit 240 is, for example, a processor(s) that includes a CPU. The shredder control unit 240 is configured as a single processor or is made up of a plurality of processors. The shredder control unit 240 causes the shredding unit 221 to shred waste paper. The shredder control unit 240 causes the mass sensor 229 to measure the amount of the plurality of fragments of paper C contained in the container box 223.

By controlling the shredder communication unit 260, the shredder control unit 240 transmits the amount of the paper fragments to the waste paper recycling management server 300. The shredder control unit 240 causes the shredder communication unit to receive the notification data, etc. from the waste paper recycling management server 300.

The shredder storage unit 250 stores various programs and various kinds of information. The shredder storage unit 250 stores the amount of the paper fragments C measured by the mass sensor 229. The shredder storage unit 250 stores the notification data and the like transmitted from the waste paper recycling management server 300. The shredder storage unit 250 is a volatile semiconductor memory such as a RAM, a ROM, a non-volatile memory such as a flash memory, etc.

The shredder communication unit 260 is an interface circuit for communicable connection to the waste paper recycling management server 300 and the like. The shredder communication unit 260 gets connected to the waste paper recycling management server 300 and the like by wire or wirelessly in accordance with a predetermined communication protocol. The shredder communication unit 260 includes a wired connector, a wireless communication port, or the like. The wired connector is a USB connector, a LAN connector, or the like. The wireless communication port is a Wi-Fi communication port, a Bluetooth communication port, or the like. The shredder communication unit 260 receives various kinds of information from the waste paper recycling management server 300 and the like via the communication network NW. The shredder communication unit 260 transmits the amount of the paper fragments C and the like to the waste paper recycling management server 300 and the like via the communication network NW. The shredder communication unit 260 corresponds to an example of a first communication unit.

The waste paper recycling management server 300 includes a server communication unit 310, a server control unit 320, and a server storage unit 330. The waste paper recycling management server 300 may include a non-illustrated display device, a non-illustrated input/output unit, and the like.

The server communication unit 310 is an interface circuit for communicable connection to the sheet manufacturing apparatus 100 and the like. The server communication unit 310 gets connected to the sheet manufacturing apparatus 100 and the like by wire or wirelessly in accordance with a predetermined communication protocol. The server communication unit 310 includes a wired connector, a wireless communication port, or the like. The wired connector is a USB connector, a LAN connector, or the like. The wireless communication port is a Wi-Fi communication port, a Bluetooth communication port, or the like. The server communication unit 310 receives information such as the produced amount of the sheets P from the sheet manufacturing apparatus 100 via the communication network NW. The server communication unit 310 receives information such as the amount of the paper fragments C from the waste paper shredder 200 via the communication network NW. The server communication unit 310 transmits the notification data and the like to the apparatus communication unit 150 of the sheet manufacturing apparatus 100 and to the shredder communication unit 260 of the waste paper shredder 200 via the communication network NW. The server communication unit 310 may transmit the notification data and the like to a terminal communication unit 410 of the terminal device 400 via the communication network NW. The terminal communication unit 410 will be described later. The server communication unit 310 corresponds to an example of a third communication unit.

The server control unit 320 is a server controller that controls each unit of the waste paper recycling management server 300. The server control unit 320 is, for example, a processor(s) that includes a CPU. The server control unit 320 is configured as a single processor or is made up of a plurality of processors. The server control unit 320 functions as various function units by executing a server control program. The server control unit 320 functions as a data processing unit 321 and a communication control unit 323 by executing the server control program. The server control unit 320 may function as a function unit other than the data processing unit 321 and the communication control unit 323 by executing the server control program. The server control unit 320 corresponds to an example of a control unit.

The data processing unit 321 generates the environment-related information. The data processing unit 321 acquires the produced amount of the sheets P from the sheet manufacturing apparatus 100 by means of the server communication unit 310. The data processing unit 321 acquires the amount of the paper fragments C from the waste paper shredder 200 by means of the server communication unit 310. Based on at least one of the produced amount of the sheets P or the amount of the paper fragments C, the data processing unit 321 generates the environment-related information. The environment-related information corresponds to an example of waste paper recycling information.

The environment-related information is data that shows a status of a reduction in environmental burdens that is achieved through recycling waste paper with the waste paper recycling system 1. The environment-related information is expressed in terms of numerical values, images, voice, and the like. The environment-related information includes the notification data that indicates that the produced amount of the sheets P manufactured by the sheet manufacturing apparatus 100 has reached the environmental target value. The environment-related information may represent the percentage of the produced amount of the sheets P manufactured by the sheet manufacturing apparatus 100 in relation to a manufacturing target value.

The data processing unit 321 receives the produced amount of the sheets P transmitted from the sheet manufacturing apparatus 100. The data processing unit 321 receives the produced amount of the sheets P transmitted from the sheet manufacturing apparatus 100 by means of the server communication unit 310. The data processing unit 321 receives the produced amount of the sheets P transmitted at a predetermined timing. The data processing unit 321 cumulatively adds the values of the produced amount of the sheets P transmitted within a predetermined period to calculate an added-up production value. The added-up production value corresponds to an example of a cumulative value. The predetermined period has been set in advance. The predetermined period is, for example, on a monthly basis. The predetermined period may be on a weekly basis or on a yearly basis. The predetermined period may be defined by a preset start date and a preset end date. The predetermined period is a time interval that is longer than a time interval of transmission of the produced amount of the sheets P. The added-up production value is reset upon exceeding the predetermined period.

The data processing unit 321 compares the added-up production value of the produced amount of the sheets P with the environmental target value. The environmental target value is read out of the server storage unit 330. The server storage unit 330 pre-stores the environmental target value. The environmental target value is, for example, a value that has been set in advance by the administrator of the waste paper recycling management server 300. The environmental target value may be a value transmitted from the sheet manufacturing apparatus 100. The environmental target value may be a value transmitted from the terminal device 400. The environmental target value is set on the basis of the number of the sheet manufacturing apparatuses 100 provided in the waste paper recycling system 1, the rate of operation thereof, and the like.

When the added-up production value of the produced amount within the predetermined period is less than the environmental target value, the data processing unit 321 continues the calculation of the added-up production value of the sheets P. The data processing unit 321 cumulatively adds the values of the produced amount of the sheets P transmitted within the predetermined period to calculate the added-up production value.

When the added-up production value of the produced amount within the predetermined period is greater than the environmental target value, the data processing unit 321 determines that the produced amount of the sheets P manufactured by the sheet manufacturing apparatus 100 has reached the environmental target value. The data processing unit 321 generates the notification data. The notification data indicates that the produced amount of the sheets P manufactured by the sheet manufacturing apparatus 100 has reached the environmental target value. The notification data corresponds to an example of user notification information.

The communication control unit 323 controls information that is transmitted or received by means of the server communication unit 310. The communication control unit 323 commands that the notification data generated by the data processing unit 321 be transmitted to the sheet manufacturing apparatus 100 and the waste paper shredder 200. The communication control unit 323 may command that the notification data generated by the data processing unit 321 be transmitted to the terminal device 400. Based on the control by the communication control unit 323, the server communication unit 310 transmits the notification data to the apparatus communication unit 150 and the shredder communication unit 260. Based on the control by the communication control unit 323, the server communication unit 310 transmits the notification data to the terminal communication unit 410.

The server storage unit 330 stores various programs, various kinds of information, and the like. The server storage unit 330 stores the produced amount of the sheets P transmitted from the sheet manufacturing apparatus 100 and the amount of the paper fragments C transmitted from the waste paper shredder 200. The server storage unit 330 stores the added-up production value calculated by the data processing unit 321. The server storage unit 330 stores the environmental target value. The server storage unit 330 may store the environmental target value that has been set in advance or store the environmental target value transmitted from the sheet manufacturing apparatus 100, etc. The server storage unit 330 stores the environment-related information generated by the data processing unit 321. The server storage unit 330 is a volatile semiconductor memory such as a RAM, a ROM, a non-volatile memory such as a flash memory, etc. The server storage unit 330 may include a magnetic recording device such as a hard disk drive (HDD). The server storage unit 330 corresponds to an example of a storage unit.

The terminal device 400 displays the notification data transmitted from the waste paper recycling management server 300. The terminal device 400 may set the environmental target value on the basis of an operation performed by the user of the terminal device 400. The terminal device 400 transmits the environmental target value to the waste paper recycling management server 300 via the communication network NW. The terminal device 400 includes the terminal communication unit 410, a terminal display unit 420, a terminal control unit 430, and a terminal storage unit 440.

The terminal communication unit 410 is an interface circuit for communicable connection to the waste paper recycling management server 300 and the like. The terminal communication unit 410 gets connected to the waste paper recycling management server 300 and the like by wire or wirelessly in accordance with a predetermined communication protocol. The terminal communication unit 410 includes a wired connector, a wireless communication port, or the like. The wired connector is a USB connector, a LAN connector, or the like. The wireless communication port is a Wi-Fi communication port, a Bluetooth communication port, or the like. The terminal communication unit 410 receives the notification data and the like from the waste paper recycling management server 300 via the communication network NW. The terminal communication unit 410 transmits the environmental target value and the like to the waste paper recycling management server 300 via the communication network NW.

The terminal display unit 420 displays various kinds of information. The terminal display unit 420 displays the notification data. When the user of the terminal device 400 sets the environmental target value, the terminal display unit 420 displays an environmental target setting screen on the basis of the control by the terminal control unit 430.

The terminal control unit 430 is a terminal controller that controls each unit of the terminal device 400. The terminal control unit 430 is, for example, a processor(s) that includes a CPU. The terminal control unit 430 is configured as a single processor or is made up of a plurality of processors. The terminal control unit 430 functions as various function units by executing an application. The terminal control unit 430 controls the terminal display unit 420 and causes it to display the notification data.

The terminal control unit 430 may allow the user to set the environmental target value by executing an application. The terminal control unit 430 causes the terminal display unit 420 to display the environmental target setting screen. When the user of the terminal device 400 performs inputting on the environmental target setting screen by using a non-illustrated input interface, the terminal control unit 430 generates the environmental target value. The terminal control unit 430 sends the environmental target value to the waste paper recycling management server 300 by means of the terminal communication unit 410.

The terminal storage unit 440 stores various application programs and various kinds of information. The terminal storage unit 440 stores the notification data. The terminal storage unit 440 is a volatile semiconductor memory such as a RAM, a ROM, a non-volatile memory such as a flash memory, etc.

The waste paper recycling system 1 includes the waste paper recycling management server 300, the sheet manufacturing apparatus 100 that is communicably connected to the waste paper recycling management server 300 via the communication network NW, and the waste paper shredder 200 that is connected to the waste paper recycling management server 300 via the communication network NW. The waste paper shredder 200 includes the shredding unit 221 that shreds waste paper to produce the plurality of fragments of paper C, and the shredder communication unit 260 for communicable connection to the waste paper recycling management server 300 via the communication network NW. The sheet manufacturing apparatus 100 includes the third unit group 103 that recycles the plurality of fragments of paper C produced by the waste paper shredder 200 into each sheet P, the sheet counter 140 that measures a produced amount of the sheets P, and the apparatus communication unit 150 that transmits the produced amount to the waste paper recycling management server 300 via the communication network NW. The waste paper recycling management server 300 includes the server communication unit 310 for communicable connection to the waste paper shredder 200 and the sheet manufacturing apparatus 100 via the communication network NW, the server storage unit 330 that stores an environmental target value within a predetermined period of the sheets P produced through recycling by the sheet manufacturing apparatus 100, and the server control unit 320 that calculates an added-up production value of the produced amount transmitted within the predetermined period from the sheet manufacturing apparatus 100 and compares the added-up production value with the environmental target value. When the added-up production value reaches the environmental target value, the server control unit 320 generates notification data indicating the reaching of the added-up production value to the environmental target value, and the server communication unit 310 transmits the notification data to the shredder communication unit 260 of the waste paper shredder 200 and the apparatus communication unit 150 of the sheet manufacturing apparatus 100. The user of the sheet manufacturing apparatus 100 and the user of the waste paper shredder 200 are able to know that the recycled production of the sheets P by the waste paper recycling system 1 has achieved the environmental target. The user of the sheet manufacturing apparatus 100 and the user of the waste paper shredder 200 are able to know that the result of the sheet production through the recycling contributes to an environmental improvement.

Figure 6:
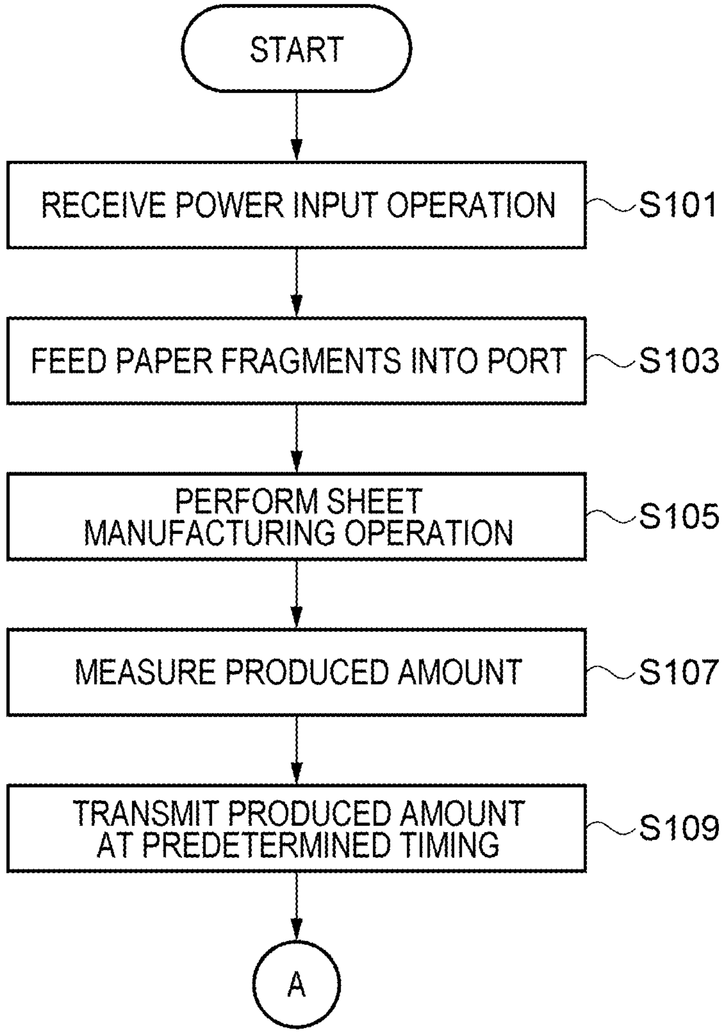
FIG. 6 is a diagram illustrating a part of a control flow executed by the waste paper recycling system.
Figure 7:
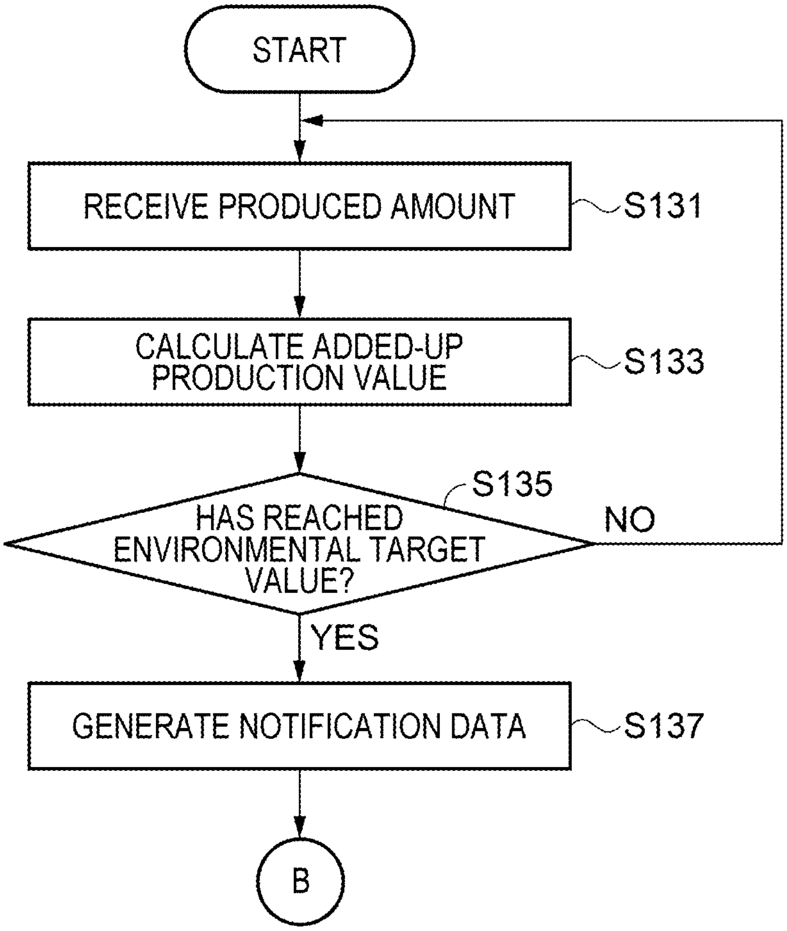
FIG. 7 is a diagram illustrating a part of the control flow executed by the waste paper recycling system.
Figure 8:
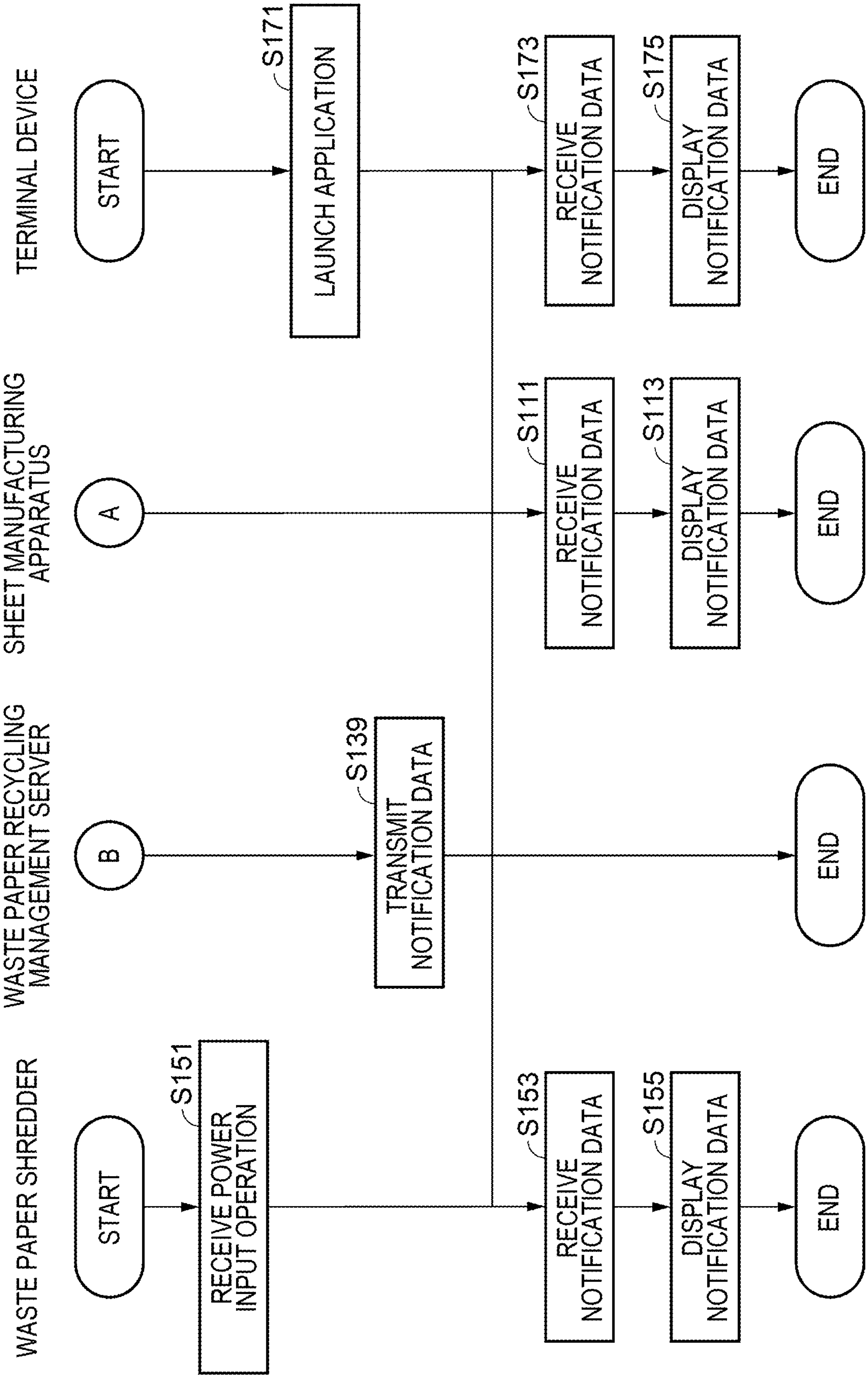
FIG. 8 is a diagram illustrating a part of the control flow executed by the waste paper recycling system.

FIGS. 6, 7, and 8 are diagrams illustrating a control flow executed by the waste paper recycling system 1. In FIGS. 6, 7, and 8, the control flow is illustrated in the form of flowcharts. The notification data is transmitted to the sheet manufacturing apparatus 100 and the waste paper shredder 200 by executing the control flow by the waste paper recycling system 1. The notification data is transmitted to the terminal device 400 by executing the control flow by the waste paper recycling system 1. The control flow executed by the waste paper recycling system 1 corresponds to an example of a method of managing waste paper recycling information.

FIG. 6 is a diagram illustrating a part of the control flow executed by the sheet manufacturing apparatus 100. The sheet manufacturing apparatus 100 is provided in the waste paper recycling system 1. The sheet manufacturing apparatus 100 recycles the fragments of paper C produced by the waste paper shredder 200 provided in the waste paper recycling system 1 into each sheet P.

In step S101, the sheet manufacturing apparatus 100 receives a power input operation. The sheet manufacturing apparatus 100 receives the power input operation when the user of the sheet manufacturing apparatus 100 performs an operation input on the power switch 111. This puts the sheet manufacturing apparatus 100 into a state of being able to manufacture the sheets P.

After receiving the power input operation, in step S103, the fragments of paper C are fed into the sheet manufacturing apparatus 100. The user of the sheet manufacturing apparatus 100 feeds the fragments of paper C into the raw material feed port 11. The fragments of paper C that are fed into the sheet manufacturing apparatus 100 are produced by the waste paper shredder 200 provided in the waste paper recycling system 1.

Upon receiving this input of the fragments of paper C, in step S105, the sheet manufacturing apparatus 100 performs sheet manufacturing operation. The sheet manufacturing apparatus 100 recycles the fragments of paper C into each sheet P by performing the sheet manufacturing operation. The sheet manufacturing apparatus 100 outputs each sheet P to stack them on the tray 91.

After performing the sheet manufacturing operation, in step S107, the sheet manufacturing apparatus 100 measures the produced amount of the sheets P. The sheet counter 140 measures the produced amount of the sheets P that are stacked on the tray 91. The sheet counter 140 causes the apparatus storage unit 130 to store the measured produced amount.

After measuring the produced amount of the sheets P, in step S109, the sheet manufacturing apparatus 100 transmits the produced amount to the waste paper recycling management server 300 at a predetermined timing. The apparatus communication unit 150 transmits the produced amount of the sheets P to the server communication unit 310 via the communication network NW at a predetermined timing. The predetermined timing may be at time intervals having been determined in advance or at the time of activation of the sheet manufacturing apparatus 100 or at the time of stopping thereof. The predetermined timing has been set in advance.

FIG. 7 is a diagram illustrating a part of the control flow executed by the waste paper recycling management server 300. The waste paper recycling management server 300 is provided in the waste paper recycling system 1. The waste paper recycling management server 300 manages a status of environmental improvement that is achieved through the recycled production of the sheets P by the waste paper recycling system 1. By executing the control flow illustrated in FIG. 7, the waste paper recycling management server 300 generates environment-related information that shows a status of environmental improvement.

In step S131, the waste paper recycling management server 300 receives the produced amount from the sheet manufacturing apparatus 100. The waste paper recycling management server 300 receives the produced amount transmitted from the sheet manufacturing apparatus 100 at a predetermined timing. The server control unit 320 receives the produced amount transmitted from the apparatus communication unit 150 via the communication network NW at the predetermined timing.

Upon receiving the produced amount, in step S133, the waste paper recycling management server 300 calculates an added-up production value. The data processing unit 321 of the server control unit 320 calculates the added-up production value each time the produced amount is received. The data processing unit 321 calculates the added-up production value of the produced amount received within a predetermined period.

After calculating the added-up production value, in step S135, the waste paper recycling management server 300 determines whether the added-up production value has reached the environmental target value or not. The data processing unit 321 compares the added-up production value with the environmental target value. The environmental target value is read out of the server storage unit 330. When the added-up production value is greater than the environmental target value, the data processing unit 321 determines that the added-up production value has reached the environmental target value. In this case (step S135: YES), the waste paper recycling management server 300 advances the process to step S137. When the added-up production value is less than the environmental target value, the data processing unit 321 determines that the added-up production value has not reached the environmental target value. In this case (step S135: NO), the waste paper recycling management server 300 returns the process to step S131.

In step S137, the waste paper recycling management server 300 generates notification data. The data processing unit 321 generates the notification data indicating that the produced amount of the sheets P manufactured by the sheet manufacturing apparatus 100 has reached the environmental target value. The notification data may include data such as the environmental target value, the produced amount, and the like.

FIG. 8 is a diagram illustrating a part of the control flow executed by the waste paper recycling management server 300. The waste paper recycling management server 300 transmits the environment-related information that includes the notification data to the sheet manufacturing apparatus 100 and the waste paper shredder 200. The sheet manufacturing apparatus 100 and the waste paper shredder 200 receive, and display, the environment-related information. The waste paper recycling management server 300 may transmit the environment-related information to the terminal device 400. The terminal device 400 receives, and displays, the environment-related information.

In step S151, the waste paper shredder 200 receives a power input operation. The waste paper shredder 200 receives the power input operation when the user of the waste paper shredder 200 performs an operation input on the power button 230. This puts the waste paper shredder 200 into a power ON state. The waste paper shredder 200 becomes able to receive the notification data transmitted by the waste paper recycling management server 300.

In step S139, the waste paper recycling management server 300 transmits the notification data to the sheet manufacturing apparatus 100 and the waste paper shredder 200. The waste paper recycling management server 300 may transmit the notification data after confirming that the sheet manufacturing apparatus 100 and the waste paper shredder 200 are in a power ON state.

When the waste paper recycling management server 300 transmits the notification data, the sheet manufacturing apparatus 100 receives the notification data in step S111. The apparatus communication unit 150 of the sheet manufacturing apparatus 100 receives the notification data transmitted from the server communication unit 310 via the communication network NW.

After receiving the notification data, in step S113, the sheet manufacturing apparatus 100 displays the notification data. The display control unit 123 of the apparatus control unit 120 causes the apparatus display 113 to display the notification data. Based on the notification data, the apparatus display 113 displays a text, an image, and the like that are included in the notification data. The apparatus display 113 may display the produced amount and the environmental target value.

When the waste paper recycling management server 300 transmits the notification data, the waste paper shredder 200 receives the notification data in step S153. The shredder communication unit 260 of the waste paper shredder 200 receives the notification data transmitted from the server communication unit 310 via the communication network NW.

After receiving the notification data, in step S155, the waste paper shredder 200 displays the notification data. The shredder control unit 240 causes the shredder display panel 217 to display the notification data. Based on the notification data, the shredder display panel 217 displays a text, an image, and the like that are included in the notification data. The shredder display panel 217 may display the produced amount and the environmental target value.

In step S171, the terminal device 400 launches an application. The terminal device 400 launches the application when the user of the terminal device 400 performs a predetermined operation input. The terminal device 400 becomes able to receive the notification data transmitted by the waste paper recycling management server 300.

When the waste paper recycling management server 300 transmits the notification data to the terminal device 400, the terminal device 400 receives the notification data in step S173. The terminal communication unit 410 of the terminal device 400 receives the notification data transmitted from the server communication unit 310 via the communication network NW.

After receiving the notification data, in step S175, the terminal device 400 displays the notification data. The terminal control unit 430 causes the terminal display unit 420 to display the notification data. Based on the notification data, the terminal display unit 420 displays a text, an image, and the like that are included in the notification data. The terminal display unit 420 may display the produced amount and the environmental target value.

The control flow is executed by the waste paper recycling system 1 that includes the waste paper recycling management server 300, the sheet manufacturing apparatus 100, and the waste paper shredder 200. The waste paper shredder 200 produces a plurality of fragments of paper C by shredding waste paper. The sheet manufacturing apparatus 100 recycles the paper fragments C produced by the waste paper shredder 200 into each sheet P, measures an amount of the sheets P produced through the recycling, and transmits the produced amount to the waste paper recycling management server 300. The waste paper recycling management server 300 calculates an added-up production value of the produced amount transmitted from the sheet manufacturing apparatus 100 within a predetermined period and compares the added-up production value with an environmental target value having been determined in advance. When the added-up production value reaches the environmental target value, the waste paper recycling management server 300 performs notification, to the waste paper shredder 200 and the sheet manufacturing apparatus 100, of notification data indicating the reaching to the environmental target value. The user of the sheet manufacturing apparatus 100 and the user of the waste paper shredder 200 are able to know that the recycled production of the sheets P by the waste paper recycling system 1 has achieved the environmental target. The user of the sheet manufacturing apparatus 100 and the user of the waste paper shredder 200 are able to know that the result of the sheet production through the recycling contributes to an environmental improvement.

The waste paper shredder 200 includes the shredder display panel 217. The waste paper shredder 200 receives the notification data and causes the shredder display panel 217 to display the notification data. By looking at the shredder display panel 217, the user of the waste paper shredder 200 is able to know that the result of the sheet production through the recycling contributes to an environmental improvement.

The sheet manufacturing apparatus 100 includes the apparatus display 113. The sheet manufacturing apparatus 100 receives the notification data transmitted from the waste paper recycling management server 300 and cause the apparatus display 113 to display the notification data. By looking at the apparatus display 113, the user of the sheet manufacturing apparatus 100 is able to know that the result of the sheet production through the recycling contributes to an environmental improvement.

The waste paper recycling system 1 includes the terminal device 400 that is communicably connected to the waste paper recycling management server 300. The waste paper recycling management server 300 transmits the notification data to the terminal device 400. The terminal device 400 receives the notification data. The user of the terminal device 400 is able to know that the result of the sheet production through the recycling contributes to an environmental improvement.

Figure 9:
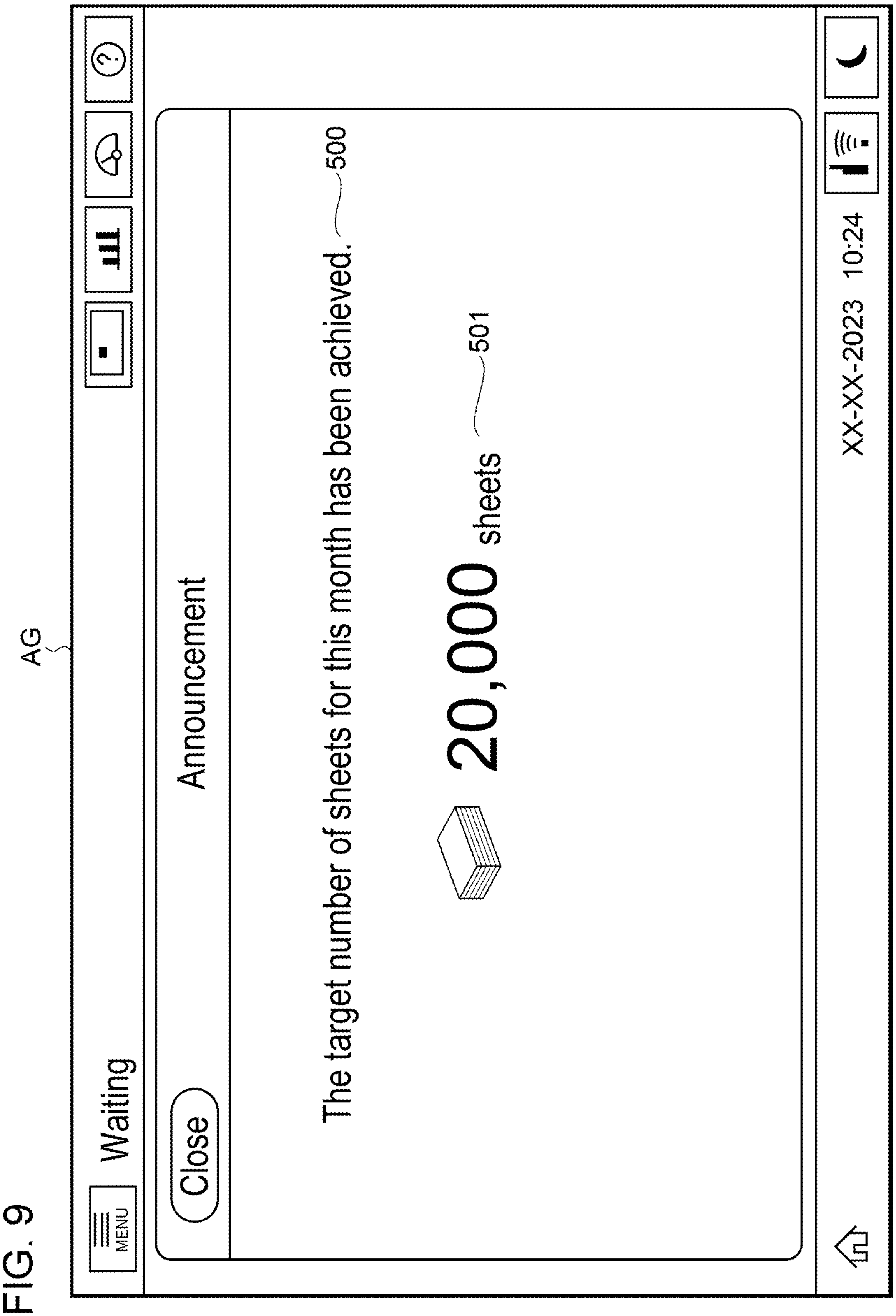
FIG. 9 is a diagram illustrating an example of display on an apparatus display.

FIG. 9 is a diagram illustrating an example of display on the apparatus display 113. An example of an apparatus display screen AG displayed on the apparatus display 113 of the sheet manufacturing apparatus 100 is illustrated in FIG. 9. The apparatus display screen AG shows a notification message 500 and a target value image 501.

The notification message 500 is included in the notification data. The notification message 500 is a text indicating that the produced amount of the sheets P manufactured by the sheet manufacturing apparatus 100 has reached the environmental target value. The notification message 500 is not limited to the text illustrated in FIG. 9. The content of the notification message 500 is not specifically limited as long as it is a text indicating that the produced amount of the sheets P manufactured by the sheet manufacturing apparatus 100 has reached the environmental target value.

The target value image 501 illustrated in FIG. 9 is made up of an image of recycled paper and a numerical goal indicating the environmental target value. The numerical goal is an equivalent value obtained by converting the environmental target value into the number of the sheets P. The target value image 501 is not limited to the one illustrated in FIG. 9. The numerical goal may be, for example, an equivalent value obtained by converting the environmental target value into the mass of the sheets P. The numerical goal may be a value indicating an amount of reduction in commercially available paper, an amount of reduction in wood, an amount of reduction in water, or the like that is achieved through the recycled production of the sheet P with the waste paper recycling system 1. The target value image 501 may be displayed on the apparatus display screen AG, or not displayed thereon. The target value image 501 may preferably be displayed on the apparatus display screen AG. Displaying the target value image 501 on the apparatus display screen AG enables the user of the sheet manufacturing apparatus 100 to confirm the fruits of environmental burden reduction activities in terms of specific numerical value.

Figure 10:
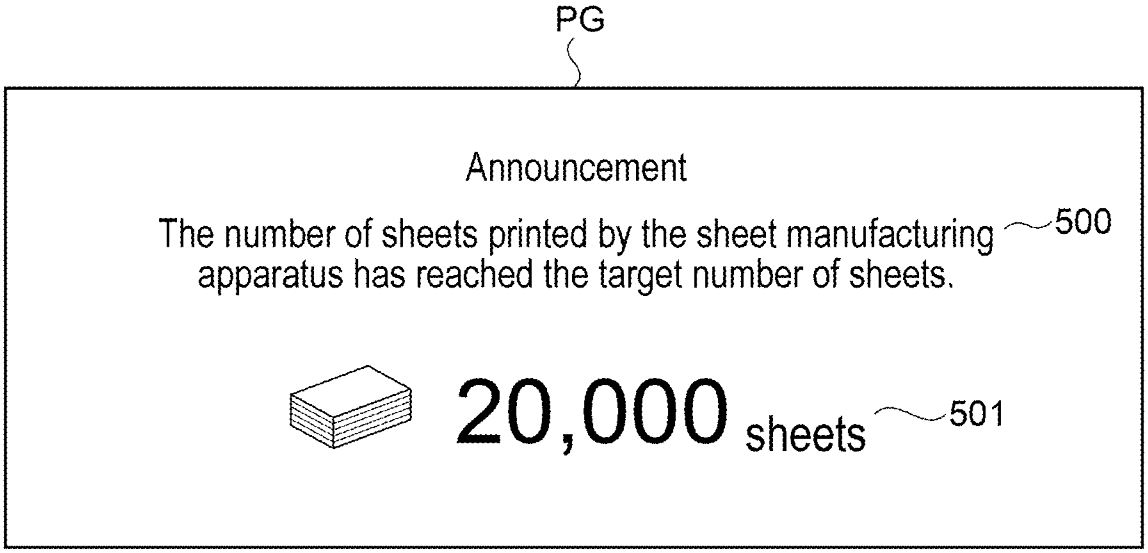
FIG. 10 is a diagram illustrating an example of display on a shredder display panel.

FIG. 10 is a diagram illustrating an example of display on the shredder display panel 217. An example of a panel display screen PG displayed on the shredder display panel 217 of the waste paper shredder 200 is illustrated in FIG. 10. The panel display screen PG shows the notification message 500 and the target value image 501.

The notification message 500 and the target value image 501 that are displayed on the panel display screen PG illustrated in FIG. 10 are the same as the notification message 500 and the target value image 501 that are displayed on the apparatus display screen AG illustrated in FIG. 9. The shredder control unit 240 of the waste paper shredder 200 commands that the panel display screen PG be displayed on the basis of the notification data. The shredder control unit 240 may command that the notification message 500 and the target value image 501 be displayed on the panel display screen PG in the same manner of display as that of the notification message 500 and the target value image 501 that are displayed on the apparatus display screen AG. The shredder control unit 240 may command that the notification message 500 and the target value image 501 be displayed on the panel display screen PG in a manner of display different from that of the notification message 500 and the target value image 501 that are displayed on the apparatus display screen AG. The manner of display of the panel display screen PG is not specifically limited as long as it is a screen that is based on the notification data.

Figure 11:
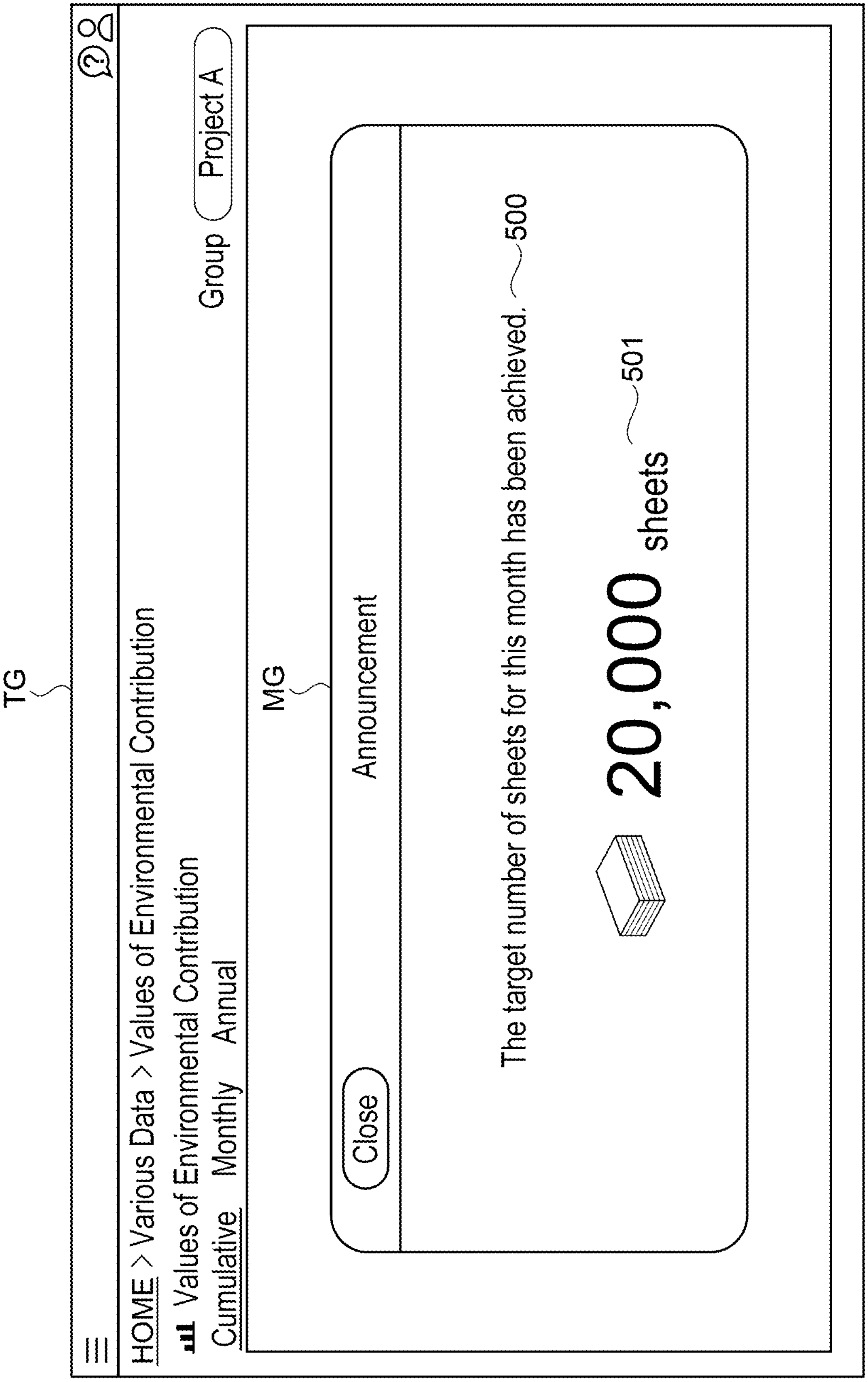
FIG. 11 is a diagram illustrating an example of display on a terminal display unit.

FIG. 11 is a diagram illustrating an example of display on the terminal display unit 420. An example of a terminal display screen TG displayed on the terminal display unit 420 of the terminal device 400 is illustrated in FIG. 11. On the terminal display screen TG illustrated in FIG. 11, a message image MG is displayed as a pop-up image. The message image MG shows the notification message 500 and the target value image 501.

The message image MG illustrated in FIG. 11 shows the notification message 500 and the target value image 501 that are the same as the notification message 500 and the target value image 501 that are displayed on the apparatus display screen AG illustrated in FIG. 9. The terminal control unit 430 of the terminal device 400 commands that the message image MG be displayed on the terminal display screen TG on the basis of the notification data. The terminal control unit 430 may command that the notification message 500 and the target value image 501 be displayed in the message image MG in the same manner of display as that of the notification message 500 and the target value image 501 that are displayed on the apparatus display screen AG. The terminal control unit 430 may command that the notification message 500 and the target value image 501 be displayed in the message image MG in a manner of display different from that of the notification message 500 and the target value image 501 that are displayed on the apparatus display screen AG. The manner of display of the message image MG is not specifically limited as long as it is an image that is based on the notification data.

Though examples of providing each user with notification data in the form of a display image are illustrated in FIGS. 9, 10, and 11, they do not imply any limitation. The notification data may be outputted from the sheet manufacturing apparatus 100 or the like in the form of voice data or the like. Outputting the notification data in the form of voice data enables each user to confirm the fruits of environmental burden reduction activities.

What is claimed is:

1. A method of managing waste paper recycling information in a waste paper recycling system, the waste paper recycling system including a management server, a waste paper recycling apparatus, and a shredder, the method comprising:

by the shredder, producing a plurality of paper fragments by shredding waste paper; and communicating, using a communication interface of the shredder, to a communication interface of the management server via a communication network:

by the waste paper recycling apparatus, recycling the paper fragments produced by the shredder into each sheet;

measuring, using a sensor of the waste paper recycling apparatus, a produced amount that is an amount of the sheets produced through the recycling; and communicating, using a communication interface of the waste paper recycling apparatus, to the communication interface of the management server via the communication network to transmit the produced amount to the management server automatically at a predetermined timing;

by the management server, receiving, using the communication interface of the management server, the produced amount from the communication interface of the waste paper recycling apparatus via the communication network;

calculating, using a processor of the management server, a cumulative value of the produced amount received from the communication interface of the waste paper recycling apparatus within a predetermined period;

comparing, using the processor of the management server, the cumulative value with a production target value having been determined in advance; and in response to determining, using the processor of the management server, that the cumulative value reaches the production target value based on a comparison result, automatically sending, using the communication interface of the management server, user notification information indicating the reaching to the production target value to the shredder and the waste paper recycling apparatus via the communication network;

by the shredder, receiving, using the communication interface of the shredder, the user notification information from the communication interface of the management server via the communication network; and displaying the user notification information on a display panel of the shredder;

by the waste paper recycling apparatus, receiving, using the communication interface of the waste paper recycling apparatus, the user notification information from the communication interface of the management server via the communication network; and displaying the user notification information on a display of the waste paper recycling apparatus.

2. The method of managing the waste paper recycling information according to claim 1, wherein the waste paper recycling system further includes a communication terminal communicably connected to the management server, the management server performs notification of the user notification information to the communication terminal, and the communication terminal receives the user notification information.

3. A waste paper recycling system, comprising:

a management server;

a waste paper recycling apparatus communicably connected to the management server via a network; and a shredder connected to the management server via the network, the shredder including, a display panel;

a shredding unit that produces a plurality of paper fragments by shredding waste paper; and a first communication interface that communicates to the management server via the network;

the waste paper recycling apparatus that recycles the plurality of paper fragments produced by the shredder into each sheet, the waste paper recycling apparatus including, a display;

a sheet sensor that measures a produced amount of the sheets; and a second communication interface that communicates to the management server via the network to transmit the produced amount to the management server automatically at a predetermined timing;

the management server including, a third communication interface that communicates to the first communication interface of the shredder and the second communication interface of the waste paper recycling apparatus via the network to receive the produced amount from the second communication interface of the waste paper recycling apparatus via the network;

a storage unit that stores a production target value within a predetermined period of the sheets produced through the recycling by the waste paper recycling apparatus; and a processor that calculates a cumulative value of the produced amount received within the predetermined period from the second communication interface of the waste paper recycling apparatus and compares the cumulative value with the production target value, wherein in response to the processor of the management server determining that the cumulative value reaches the production target value based on the comparison result, the the management server automatically generates, using the processor of the management server, user notification information indicating the reaching to the production target value, and automatically transmits, using the third communication interface of the management server, the user notification information to the first communication interface of the shredder and the second communication interface of the waste paper recycling apparatus via the network, the shredder receives, using the first communication interface of the shredder, the user notification information from the third communication interface of the management server via the network, and displays the user notification information on the display panel of the shredder, and the waste paper recycling apparatus receives, using the second communication interface of the waste paper recycling apparatus, the user notification information from the third communication interface of the management server, and displays the user notification information on the display of the waste paper recycling apparatus.

* * * * *